US008416000B2

(12) United States Patent
Endo

(10) Patent No.: US 8,416,000 B2
(45) Date of Patent: *Apr. 9, 2013

(54) CLOCK SIGNAL GENERATION CIRCUIT AND SEMICONDUCTOR DEVICE

(75) Inventor: Masami Endo, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 102 days.

This patent is subject to a terminal disclaimer.

(21) Appl. No.: 12/609,422

(22) Filed: Oct. 30, 2009

(65) Prior Publication Data
US 2010/0045355 A1 Feb. 25, 2010

Related U.S. Application Data

(62) Division of application No. 12/056,896, filed on Mar. 27, 2008, now Pat. No. 7,612,598.

(30) Foreign Application Priority Data

Apr. 27, 2007 (JP) .................................. 2007-117849

(51) Int. Cl.
H03K 3/017 (2006.01)
H03K 5/135 (2006.01)
H03K 7/08 (2006.01)

(52) U.S. Cl.
USPC .............................. 327/175; 327/36; 327/291

(58) Field of Classification Search .................. None
See application file for complete search history.

(56) References Cited

U.S. PATENT DOCUMENTS

| 4,841,167 | A | | 6/1989 | Saegusa | |
|---|---|---|---|---|---|
| 5,432,468 | A | * | 7/1995 | Moriyama et al. | 327/152 |
| 5,638,019 | A | * | 6/1997 | Frankeny | 327/295 |
| 6,037,734 | A | | 3/2000 | Toyomura | |
| 6,084,933 | A | * | 7/2000 | Kubinec | 375/362 |
| 6,707,866 | B1 | | 3/2004 | Ito | |

(Continued)

FOREIGN PATENT DOCUMENTS

| CN | 1649151 A | 8/2005 |
|---|---|---|
| CN | 1897462 A | 1/2007 |

(Continued)

OTHER PUBLICATIONS

European Search Report (Application No. 8005881.1) dated Jan. 28, 2011, 7 pages, in English.

(Continued)

Primary Examiner — Lincoln Donovan
Assistant Examiner — Terry L Englund
(74) Attorney, Agent, or Firm — Fish & Richardson P.C.

(57) ABSTRACT

In a semiconductor device capable of radio communication, a stable clock signal is generated even if a reference clock signal for generating a clock signal has varied frequencies in each cycle. A clock signal generation circuit includes an edge detection circuit that detects an edge of an input signal and generates a synchronization signal, a reference clock signal generation circuit that generates a clock signal which functions as reference, a counter circuit that counts the number of edges of rise of the reference clock signal in accordance with the synchronization signal, a duty ratio selection circuit that selects a duty ratio of a clock signal from a count value, and a frequency division circuit that generates the clock signal having the selected duty ratio.

15 Claims, 19 Drawing Sheets

U.S. PATENT DOCUMENTS

| | | | |
|---|---|---|---|
| 6,967,514 B2 * | 11/2005 | Kizer et al. ............... 327/175 |
| 7,042,821 B2 | 5/2006 | Takayama et al. |
| 7,142,028 B2 * | 11/2006 | Chun .......................... 327/175 |
| 7,159,200 B2 * | 1/2007 | Yoneda ...................... 716/113 |
| 7,180,346 B2 | 2/2007 | Lee |
| 7,233,186 B2 | 6/2007 | Ishimi |
| 7,333,151 B2 | 2/2008 | Ozawa |
| 7,369,636 B2 | 5/2008 | Goko |
| 7,405,607 B2 | 7/2008 | Ishimi |
| 7,437,633 B1 * | 10/2008 | Lesea et al. ............... 714/725 |
| 7,449,931 B2 * | 11/2008 | Abe ............................ 327/175 |
| 7,532,052 B2 * | 5/2009 | Nonaka ...................... 327/175 |
| 7,583,158 B2 * | 9/2009 | Makita et al. ............. 332/109 |
| 7,598,783 B2 * | 10/2009 | Shin et al. ................. 327/158 |
| 7,612,598 B2 * | 11/2009 | Endo .......................... 327/291 |
| 7,633,324 B2 * | 12/2009 | Yun et al. .................. 327/160 |
| 7,724,056 B2 * | 5/2010 | Miki et al. ................. 327/175 |
| 7,821,315 B2 * | 10/2010 | Bossu et al. .............. 327/175 |
| 2002/0036598 A1 | 3/2002 | Shibata |
| 2003/0128059 A1 | 7/2003 | Saeki |
| 2003/0204766 A1 | 10/2003 | Akasaka et al. |
| 2004/0264620 A1 | 12/2004 | Tanaka |
| 2005/0264696 A1 | 12/2005 | Ozawa |
| 2006/0238231 A1 * | 10/2006 | Mutaguchi ................ 327/291 |
| 2008/0265961 A1 | 10/2008 | Endo |

FOREIGN PATENT DOCUMENTS

| | | |
|---|---|---|
| EP | 0 261 428 A2 | 3/1988 |
| JP | 61-225937 A | 10/1986 |
| JP | 63-153920 A | 6/1988 |
| JP | 11-225091 | 8/1999 |
| JP | 2001-352317 A | 12/2001 |
| JP | 2005-020471 A | 1/2005 |
| JP | 2006-165931 A | 6/2006 |
| WO | 2000/008790 A1 | 2/2000 |

OTHER PUBLICATIONS

Mehdi-Laurent Akkar et al.; "An Implementation of DES and AES, Secure against Some Attacks"; *Proceedings of CHES2001, LNCS 2162*; pp. 309-318; 2001.

Hiroki Dembo et al.; "RFCPUs on Glass and Plastic Substrates fabricated by TFT Transfer Technology"; *IEDM 05—Tech. Dig. Papers*; pp. 1067-1069; 2005.

Office Action, Chinese Application No. 200810088494.8, dated Jul. 13, 2011, 12 pages with English translation.

\* cited by examiner

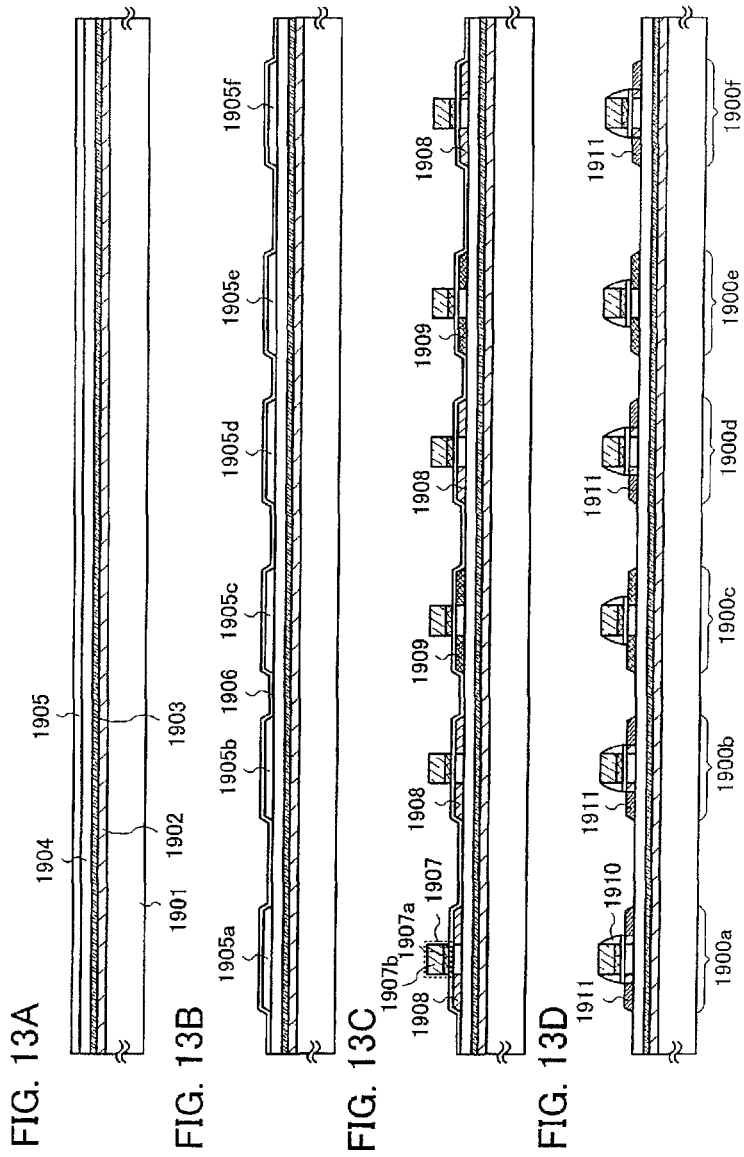

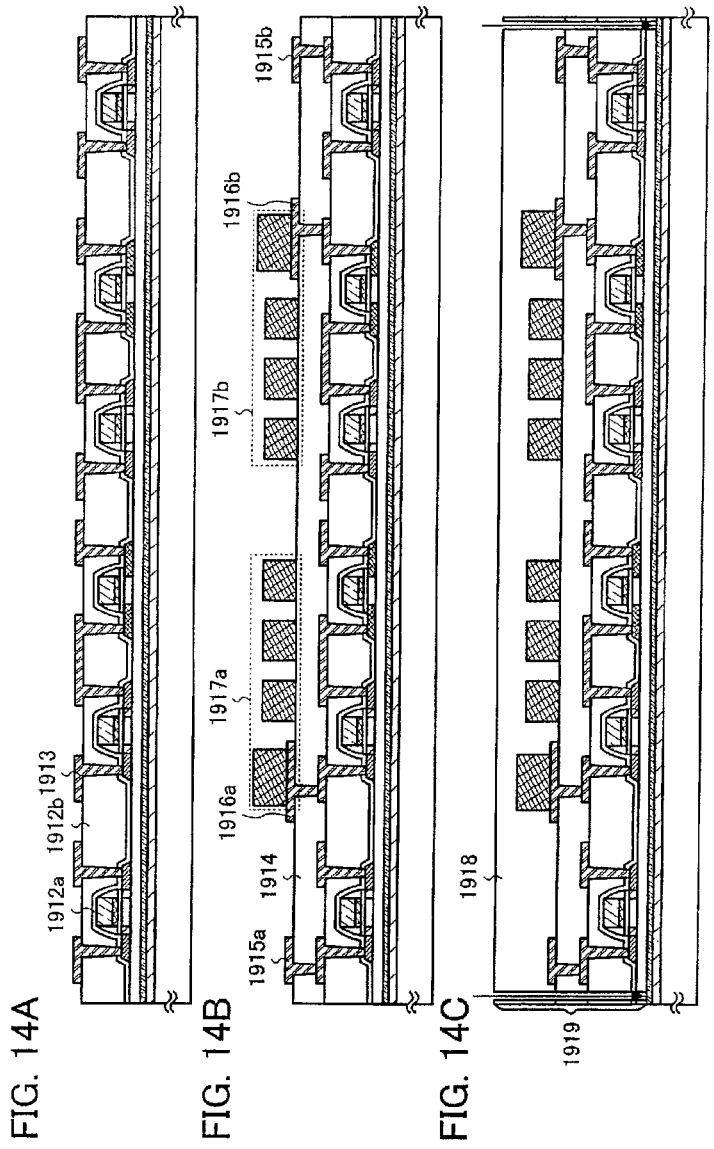

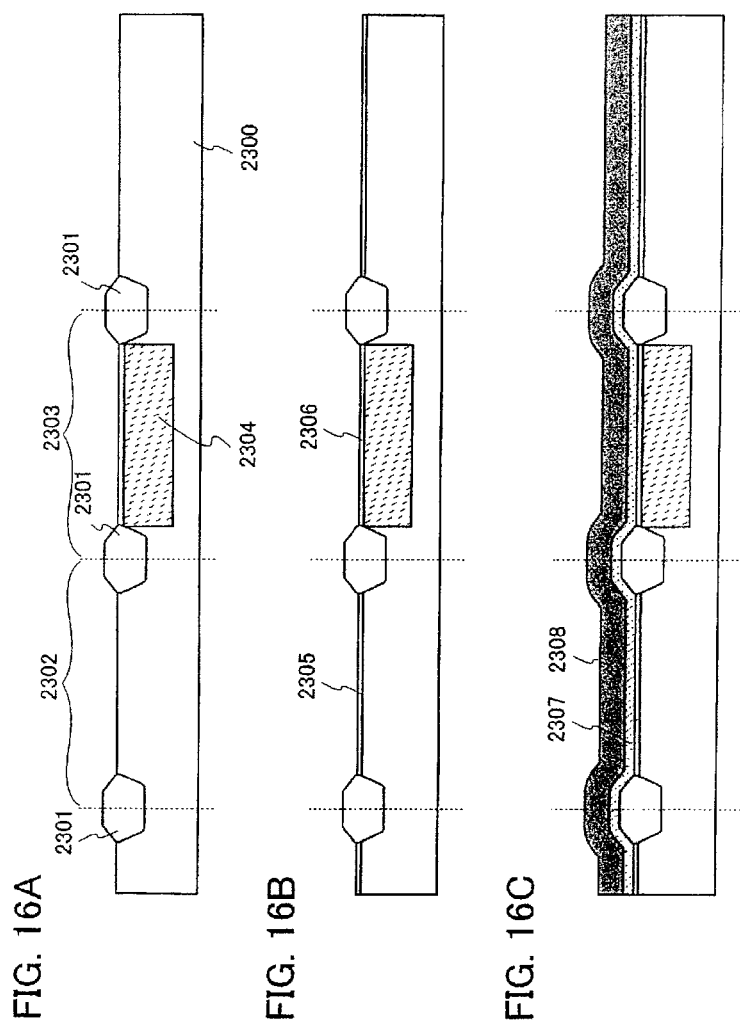

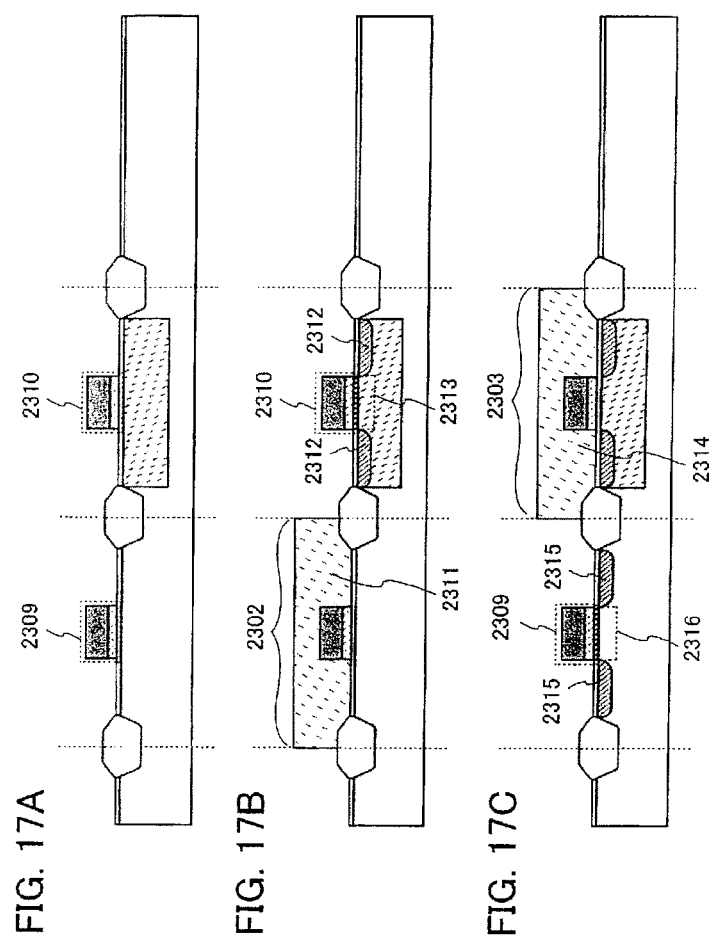

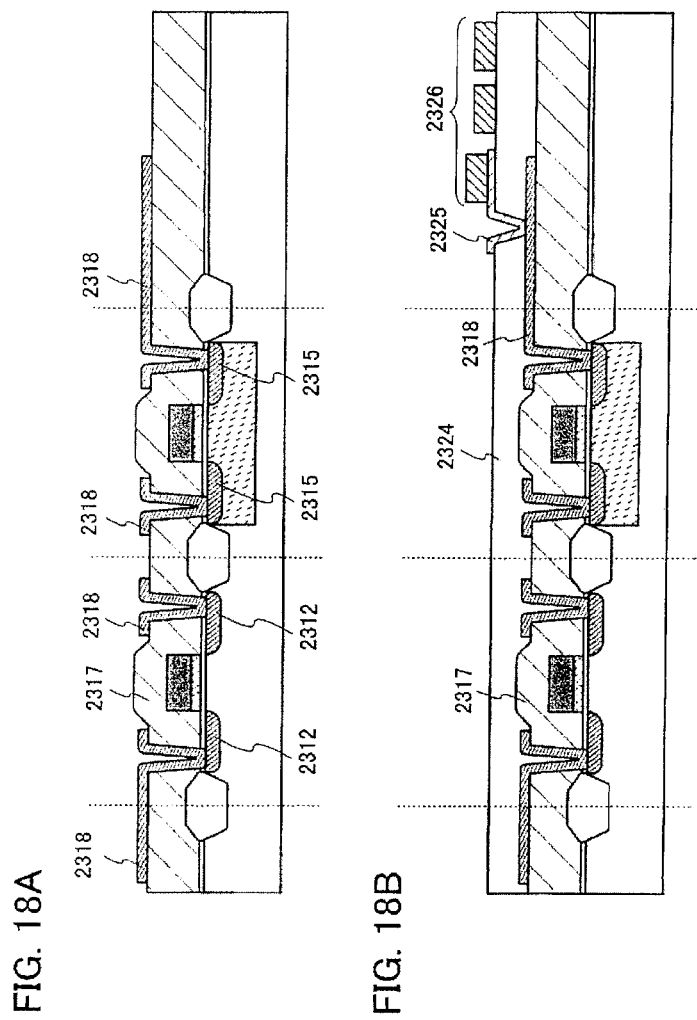

CLOCK SIGNAL GENERATION CIRCUIT AND SEMICONDUCTOR DEVICE

CROSS-REFERENCE TO RELATED APPLICATIONS

This application is a divisional of U.S. application Ser. No. 12/056,896, filed Mar. 27, 2008, issued on Nov. 3, 2009 as U.S. Pat. No. 7,612,598, which claims the benefit of a foreign priority application filed in Japan as Serial No. 2007-117849 on Apr. 27, 2007, both of which are incorporated by reference.

BACKGROUND OF THE INVENTION

1. Field of the Invention

The present invention relates to a circuit which generates a clock signal. Further, the present invention also relates to a semiconductor device mounted with such a circuit which generates a clock signal.

2. Description of the Related Art

In recent years, semiconductor devices (also referred to as RFID tags, wireless tags, ID tags, or RF tags) in which an ultrasmall IC chip and an antenna for radio communication are combined have been in the limelight. Such semiconductor devices enable non-contact transmitting and receiving of data (e.g. writing or reading out data) by transmitting and receiving communication signals to and from a transmitting/receiving circuit or the like using a radio communication device (an apparatus capable of radio communication: e.g. a reader/writer, a mobile phone, or a personal computer).

As an application field of semiconductor devices which transmit and receive data by radio signals, merchandise management in the distribution industry can be given, for example. Merchandise management using bar codes and the like is the mainstream at present; however, when there is an interrupting object, data cannot be read in some cases because bar codes are read optically. On the other hand, when data is transmitted and received without contact and with the use of a radio communication device, data of the semiconductor device is read wirelessly; thus, even when there is an interrupting object, the data can be read if radio communication signals pass through the interrupting object. Therefore, improvement in efficiency, cost reduction, and the like of merchandise management are expected. Further, a wide range of applications including passenger tickets, airplane tickets, and automatic payment of tolls is expected. Such a system that identifies and manages people or objects with a small semiconductor device which transmits and receives data by radio communication is called RFID (radio frequency identification), and has attracted attention as fundamental technology of the IT society (for example, see Reference 1: Japanese Published Patent Application No. H11-225091).

In transmitting and receiving signals between a radio communication device and a semiconductor device, it is possible to use different clock signals between the radio communication device and the semiconductor device. When different clock signals are used, however, data that is output from each of the devices corresponds to a clock of each device; therefore, when a fall of a reception signal which is output from the radio communication device and a rise of a clock in the semiconductor device are in synchronization with each other, there occurs a change in the duty ratio of the clock of the semiconductor device by a next fall of the reception signal; thus, set-up time and hold time of the signal are not kept constant, unfortunately.

As a circuit which generates clock signals, a PLL circuit can be given. A PLL circuit can control an oscillation frequency using a voltage regulating oscillator circuit (VCO). When a clock signal generation circuit is used for a passive semiconductor device or the like using a power supply at an external portion, a power-thrifty clock signal generation circuit without a VOC circuit or the like is required; however, when a power-thrifty clock signal generation circuit is used, it is difficult to generate a clock signal with a constant frequency due to the low power consumption.

In this specification, a change of a signal from low potential to high potential is referred to as a "rise." Further, a change in a signal from high potential to low potential is referred as a "fall."

Furthermore, in this specification, a point of change in potential at a rise or a fall is referred to as an "edge."

A conventional method for generating a clock signal is described here. In a period of a synchronization signal which has a regular cycle and has been transmitted from an external circuit such as a radio communication device to a semiconductor device, the number of edges of a reference clock signal that has been output from a reference clock signal generation circuit such as a ring oscillator is counted by a counter circuit or the like, and a clock signal is generated on the basis of a value obtained by dividing a count value by an appropriate value for obtaining the clock signal with a given pulse number using a frequency division circuit or the like. At this time, a remainder obtained by dividing the count value by the appropriate value becomes a period in which a clock signal is not generated, and in each clock signal, unfortunately, a first half of cycles and a latter half of cycles have low periods of different lengths depending on a count value.

Here, one cycle means a period from an N-th (N is a natural number) fall to a subsequent (N+1)-th fall in a synchronization signal when an initial state is a high state.

In this specification, a high state designates a state of a signal rise, and a low state designates a state of a signal fall.

An operation of a conventional clock signal generation circuit is described with reference to a timing chart in FIG. 11.

First, using a reference clock signal 2101 from a reference clock signal generation circuit and a synchronization signal 2102, the number of edges of the reference clock signal 2101 in one cycle of the synchronization signal 2102 is counted in a counter circuit.

A count value 2103 is obtained by counting the number of edges of the reference clock signal 2101 and resetting a count value in accordance with the synchronization signal 2102.

A first clock signal 2104 and a second clock signal 2105 are two-phase clock signals generated on the basis of the count value. At this time, the duty ratio of the first clock signal 2104 to the second clock signal 2105 is 1:3. A period 2004 is a period when the first clock signal 2104 is in a high state (hereinafter, referred to as a "high period"), and a period 2005 is a period when the first clock signal 2104 is in a low state (hereinafter, referred to as a "low period"). Further, in the duty ratio of 1:3, a period which corresponds to "1" is the period 2004, and a period which corresponds to "3" is the period 2005. Although the duty ratio of each of the first clock signal 2104 and the second clock signal 2105 is 1:3 as described above, each low period has a different length in each cycle because an extra low period arises in dividing.

A control signal 2106 is generated on the basis of the first clock signal 2104 and the second clock signal 2105. When an initial state is a low state, the control signal 2106 is placed in a high state in accordance with a rise of the first clock signal 2104, and placed in a low state in accordance with a rise of the second clock signal 2105. At this time, in the control signal 2106 generated on the basis of the first clock signal 2104 and the second clock signal 2105, an N-th (N is a natural number) cycle is designated by 2009, and an (N+1)-th cycle is designated by 2010.

As shown in FIG. 11, the synchronization signal 2102 generated on the basis of the first clock signal 2104 and the second clock signal 2105 has different frequencies in the signal cycle 2009 and the signal cycle 2010. At this time, a low period 2007 in the signal cycle 2010 is 1.75 times longer than a low period 2006 in the signal cycle 2009.

As described above, a generated clock signal has a large difference in the length of low period in each cycle; therefore, it is difficult to perform a normal operation when a circuit is operated using a control signal generated on the basis of the clock signal.

The present invention is made in view of the above problem, and has an object of providing a clock signal generation circuit capable of generating a clock signal with little variation in the length of periods even when a reference clock signal varies in a frequency in each cycle.

As a means for achieving the above object, an aspect of the present invention is a clock signal generation circuit which generates a clock signal by selecting an optimum duty ratio in accordance with a frequency of a received signal.

Concretely, an aspect of the present invention is a clock signal generation circuit including an edge detection circuit which detects an edge of an input signal, a reference clock signal generation circuit which generates a reference clock signal, a counter circuit which counts the number of edges of the reference clock signal in accordance with a signal input from the edge detection circuit, a duty ratio selection circuit which selects a given duty ratio in accordance with a count value of the reference clock signal in the counter circuit, and a frequency division circuit which divides the reference clock signal and generates a clock signal having the duty ratio selected by the duty ratio selection circuit.

Another aspect of the present invention is a clock signal generation circuit including an edge detection circuit which detects an edge of an input signal, a reference clock signal generation circuit which generates a reference clock signal, a counter circuit which counts the number of edges of the reference clock signal in accordance with a signal input from the edge detection circuit, a duty ratio selection circuit which selects first and second duty ratios in accordance with a count value of the reference clock signal in the counter circuit, and a frequency division circuit which divides the reference clock signal and generates a first clock signal having the first duty ratio selected by the duty ratio selection circuit and a second clock signal having the second duty ratio selected by the duty ratio selection circuit.

In the present invention, the duty ratio selection circuit may include a memory portion which stores data of a plurality of duty ratios, and a duty ratio selection portion which judges the count value input from the counter circuit, selects data of one duty ratio from the memory portion on the basis of the count value, and outputs the data to the frequency division circuit.

In the present invention, the edge detection circuit may be constructed from any combination of a counter circuit, a latch circuit, a NOT circuit, an AND circuit, an OR circuit, a NAND circuit, a NOR circuit, an EXOR circuit, and an EX-NOR circuit.

Another aspect of the present invention is a semiconductor device including: the clock signal generation circuit described above, an RF circuit which is capable of transmitting and receiving a signal and generates power source voltage from a received signal, and a logic circuit which carries out arithmetic operation using a clock signal generated in the clock signal generation circuit.

With the use of a clock signal generation circuit of the present invention, a clock signal can be generated with little variation in the length of one cycle even when a reference clock signal varies in a frequency.

BRIEF DESCRIPTION OF THE DRAWINGS

In the accompanying drawings:

FIGS. 13A to 13D are cross-sectional views showing a method for manufacturing a semiconductor device including a clock signal generation circuit of Embodiment Mode 4 of the present invention;

FIGS. 14A to 14C are cross-sectional views showing a method for manufacturing a semiconductor device including a clock signal generation circuit of Embodiment Mode 4 of the present invention;

FIGS. 16A to 16C are cross-sectional views showing a method for manufacturing a semiconductor device including a clock signal generation circuit of Embodiment Mode 5 of the present invention;

FIGS. 17A to 17C are cross-sectional views showing a method for manufacturing a semiconductor device including a clock signal generation circuit of Embodiment Mode 5 of the present invention;

FIGS. 18A and 18B are cross-sectional views showing a method for manufacturing a semiconductor device including a clock signal generation circuit of Embodiment Mode 5 of the present invention.

DETAILED DESCRIPTION OF THE INVENTION

Hereinafter, embodiment modes of the present invention are described with reference to the drawings. Note that the present invention is not limited to the following description, and it is easily understood by those skilled in the art that the modes and details disclosed herein can be modified in various ways without departing from the spirit and scope of the present invention. Therefore, the present invention should not be interpreted as being limited to the description of the embodiment modes to be given below.

Embodiment Mode 1

This embodiment mode describes a structure and an operation of a clock signal generation circuit of the present invention.

First, a structure of a clock signal generation circuit of the present invention is described with reference to FIG. 1.

Figure 1:
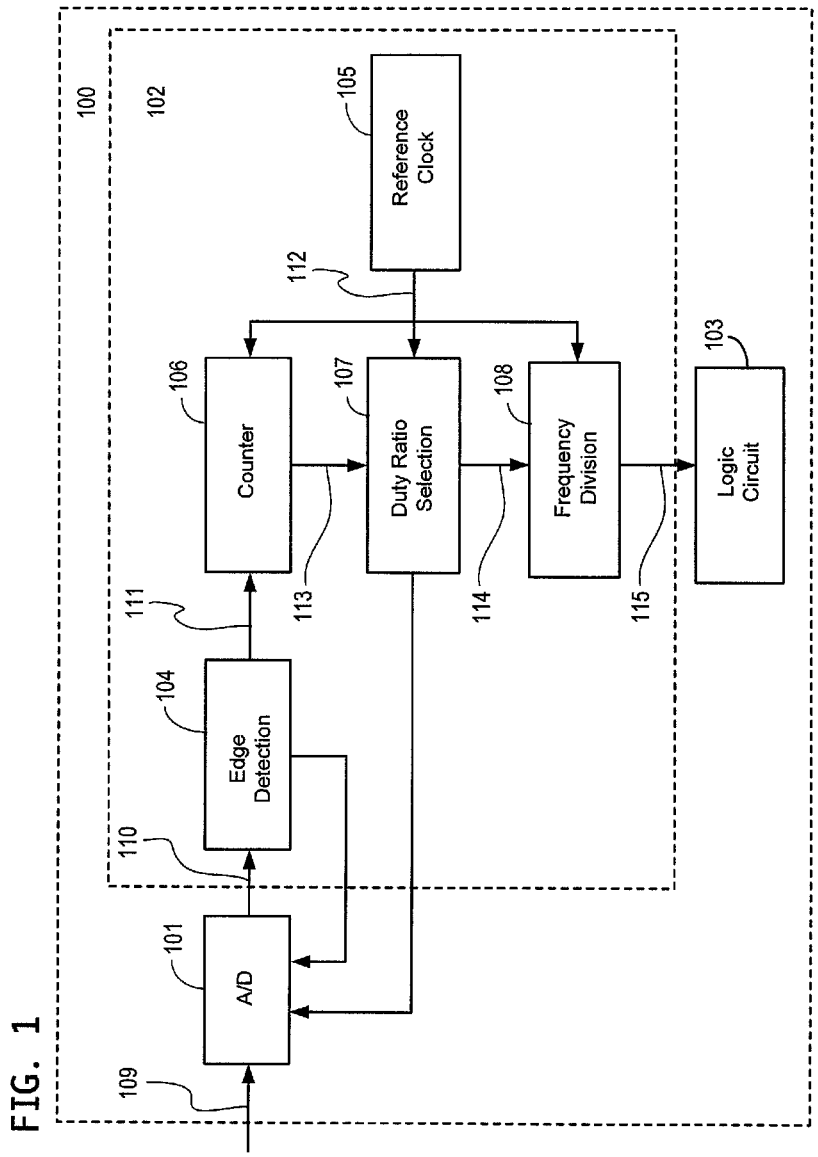
FIG. 1 is a block diagram of a clock signal generation circuit of the present invention.

As shown in FIG. 1, a semiconductor device 100 includes an A/D conversion circuit 101, a clock signal generation circuit 102, and a logic circuit 103.

The A/D conversion circuit 101 has a function of converting an analog data signal received from the outside (e.g. from a radio communication device) into a digital data signal.

The clock signal generation circuit 102 includes an edge detection circuit 104, a reference clock signal generation circuit 105, a counter circuit 106, a duty ratio selection circuit 107, and a frequency division circuit 108.

The edge detection circuit 104 is electrically connected to the A/D conversion circuit 101 and the counter circuit 106. The counter circuit 106 is electrically connected to the edge detection circuit 104, the reference clock signal generation circuit 105, and the duty ratio selection circuit 107. The duty ratio selection circuit 107 is electrically connected to the A/D conversion circuit 101, the reference clock signal generation circuit 105, the counter circuit 106, and the frequency division circuit 108. The reference clock signal generation circuit 105 is electrically connected to the counter circuit 106, the duty ratio selection circuit 107, and the frequency division circuit 108.

The edge detection circuit 104 detects an edge of a received signal. As the edge detection circuit 104, a combination of judgment circuits selected from a counter circuit, a latch circuit, a NOT circuit, an AND circuit, an OR circuit, a NAND circuit, a NOR circuit, an EXOR circuit, an EX-NOR circuit, and the like can be used.

The reference clock signal generation circuit 105 has a function of generating a reference clock signal 112 that is used to generate a clock signal 115 and has a given frequency. As the reference clock signal generation circuit 105, a ring oscillator or the like can be used, for example.

The counter circuit 106 counts the number of edges of the reference clock signal 112, resets a value which is counted in accordance with a synchronization signal 111 input from the edge detection circuit 104, and outputs a data signal of a generated count value into the duty ratio selection circuit 107.

The duty ratio selection circuit 107 has a function of selecting a given duty ratio in accordance with the count value in the counter circuit 106. Concretely, the duty ratio selection circuit 107 includes a memory portion in which data of a plurality of duty ratios is stored, and a duty ratio selection portion which selects a duty ratio from the data of the plurality of duty ratios in accordance with the count value in the counter circuit 106.

The frequency division circuit 108 has a function of generating a clock signal from the reference clock signal 112 generated by the reference clock signal generation circuit 105, and from the data of the duty ratio selected by the duty ratio selection circuit 107.

The logic circuit 103 generates a control signal from an input clock signal. The logic circuit 103 operates in accordance with the control signal.

Figure 2:
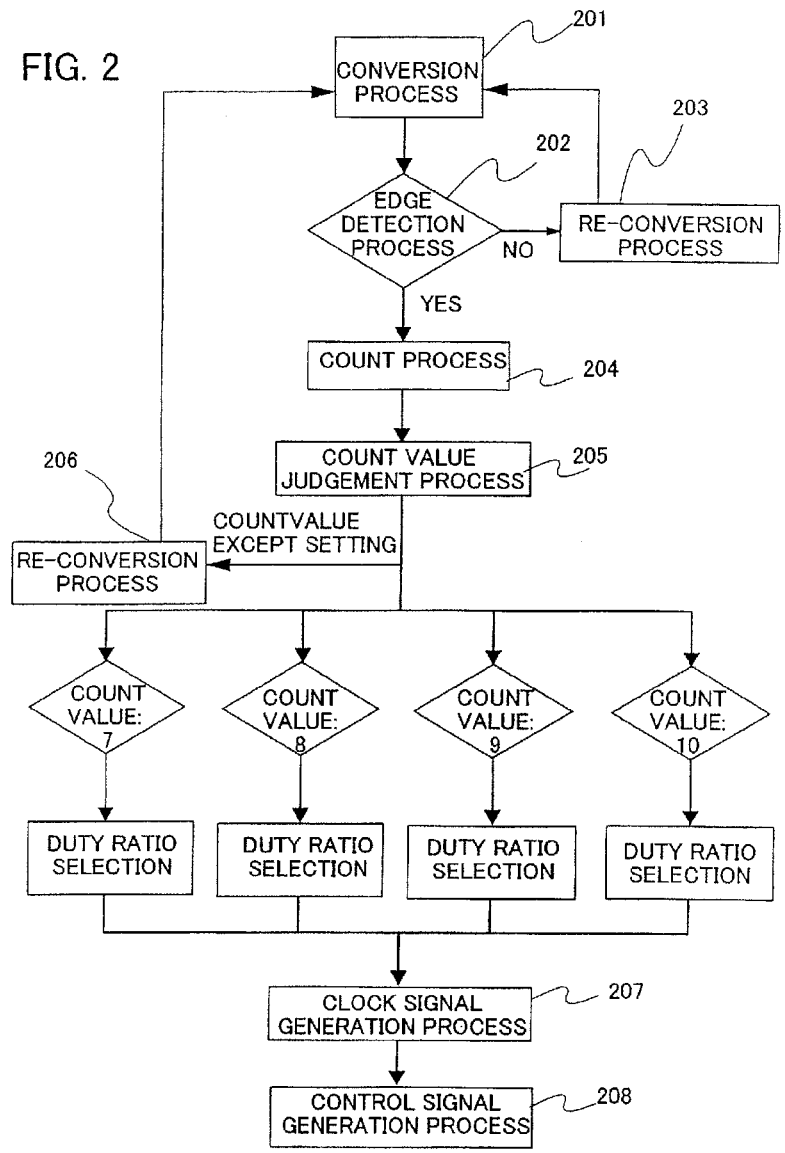
FIG. 2 is a flow chart in an operation of a clock signal generation circuit of Embodiment Mode 1.

Next, al operation of a clock signal generation circuit of this embodiment mode is described with reference to FIGS. 1 and 2.

First, as a conversion process 201, the A/D conversion circuit 101 converts an analog signal 109 input from a radio communication device or the like into a digital signal 110, and outputs the digital signal 110 to the edge detection circuit 104.

Next, as an edge detection process 202, the edge detection circuit 104 detects an edge of the input digital signal 110, and the synchronization signal 111 is generated and output to the counter circuit 106. If any edge cannot be detected at this time, as a re-conversion process 203, a value of the counter circuit 106 is counted, and an analog signal is converted into a digital signal again in the A/D conversion circuit 101.

Next, as a count process 204, the counter circuit 106 counts the number of edges of the reference clock signal 112 input from the reference clock signal generation circuit 105. A count value in the counter circuit 106 is reset in accordance with the synchronization signal 111 input from the edge detection circuit 104, and a data signal of the count value from start of the counting to the reset is output to the duty ratio selection circuit 107.

Next, as a count value judgment process 205, the duty ratio selection circuit 107 judges the count value input from the counter circuit 106, selects data of a given duty ratio from data of signal waveforms of a plurality of duty ratios in accordance with the count value judged, and outputs the data of the given duty ratio to the frequency division circuit 108 as a data signal of a signal waveform of the duty ratio. Note that this embodiment mode explains the case where the count value is any of 7 to 10. If the count value falls outside values which are set for judgment, the duty ratio selection circuit 107 cannot set a duty ratio; therefore, in such a case, as a re-conversion process 206, the A/D conversion circuit 101 converts an analog signal into a digital signal again.

Next, as a clock signal generation process 207, the frequency division circuit 108 divides the reference clock signal 112 in accordance with the input data signal of the signal waveform, generates the clock signal 115, which has the given duty ratio and the given number of edges, and outputs the clock signal 115 to the logic circuit 103.

Finally, as a control signal generation process 208, the logic circuit 103 generates a control signal which is placed in a high state on an N-th (N is a natural number) rise of the input clock signal 115 and placed in a low state on an (N+1)-th rise of the input clock signal 115. Each circuit in the logic circuit 103 operates using the control signal.

This embodiment mode has described the case where the count value is any of 7 to 10. Also in the case where the count value has a value other than 7 to 10, however, a clock signal generation circuit of this embodiment mode can be applied if data stored in the duty ratio selection circuit 107 is changed in advance.

Now, timing of signals which are generated in the clock signal generation circuit of this embodiment mode in accordance with each count value is described with reference to FIGS. 3 to 6. FIGS. 3 to 6 show timing of the reference clock signal 112, the synchronization signal 111, a count value 113, the clock signal 115, and a control signal 118.

Figure 3:
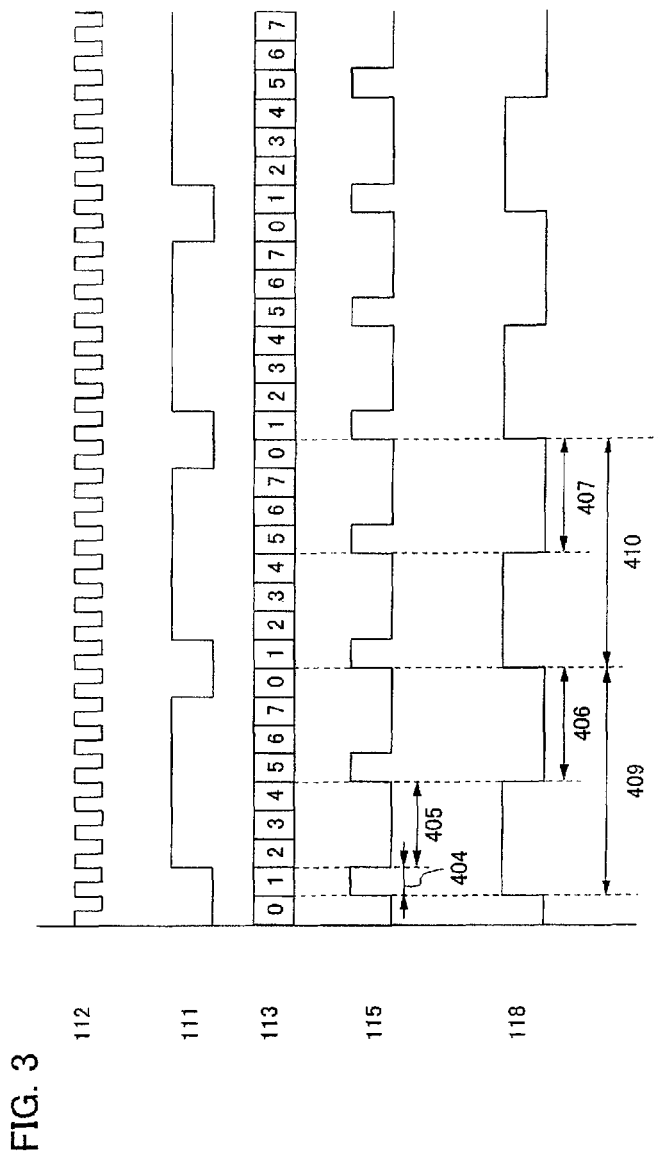
FIG. 3 is a timing chart of each signal in an operation of a clock signal generation circuit of Embodiment Mode 1.

First, the case where the count value is 7 in the counter circuit 106 is shown in FIG. 3.

When the count value is 7, the clock signal 115 is generated on the basis of the count value and in accordance with data of a signal waveform of a duty ratio selected in the duty ratio selection circuit 107. In this case, the duty ratio (the ratio of a high period 404 to a low period 405) of the clock signal 115 is 1:3.

The control signal 118 is generated in the logic circuit 103, and is placed in a high state on an N-th (N is a natural number) rise of the clock signal 115 and placed in a low state on an (N+1)-th rise of the clock signal 115. In the control signal 118, at this time, the length of a low period 406 in an N-th (N is a natural number) signal cycle 409 is equal to that of a low period 407 in an (N+1)-th signal cycle 410.

Figure 4:
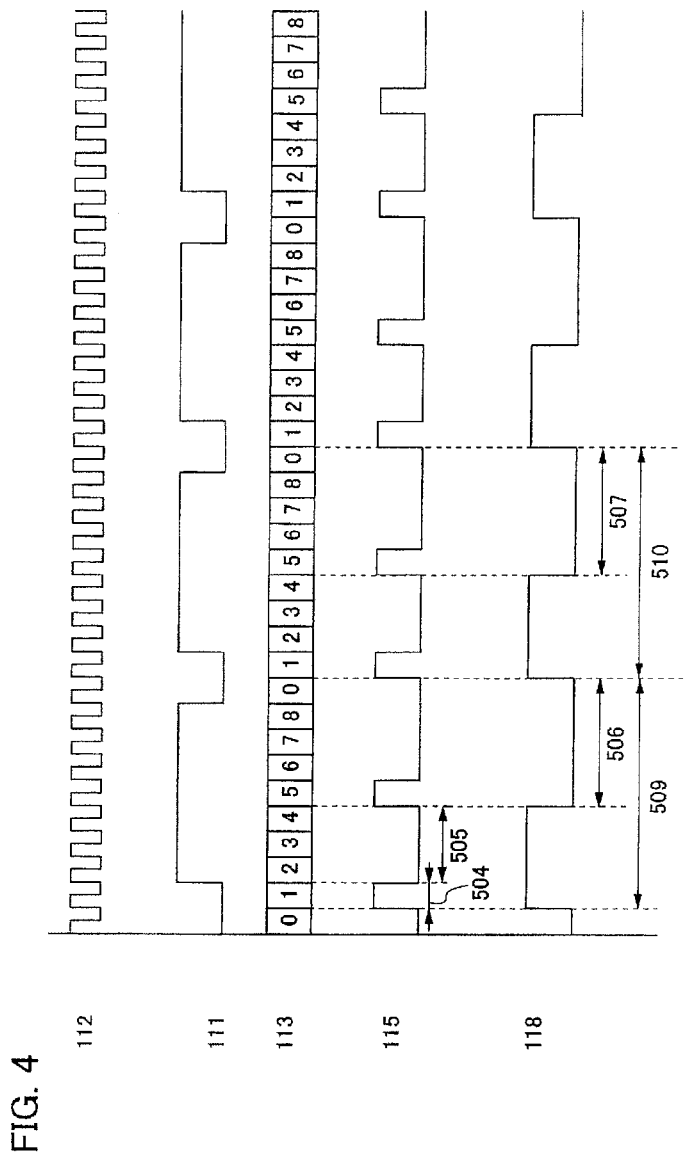
FIG. 4 is a timing chart of each signal in an operation of a clock signal generation circuit of Embodiment Mode 1.

Next, the case where the count value is 8 in the counter circuit 106 is shown in FIG. 4.

When the count value is 8, the clock signal 115 is generated on the basis of the count value and in accordance with data of a signal waveform of a duty ratio selected in the duty ratio selection circuit 107. In this case, the duty ratio (the ratio of a high period 504 to a low period 505) of the clock signal 115 is 1:3.

The control signal 118 is generated in the logic circuit 103, and is placed in a high state on an N-th (N is a natural number) rise of the clock signal 115 and placed in a low state on an (N+1)-th rise of the clock signal 115. In the control signal 118, at this time, the length of a low period 506 in an N-th (N is a natural number) signal cycle 509 is equal to that of a low period 507 in an (N+1)-th signal cycle 510.

Figure 5:
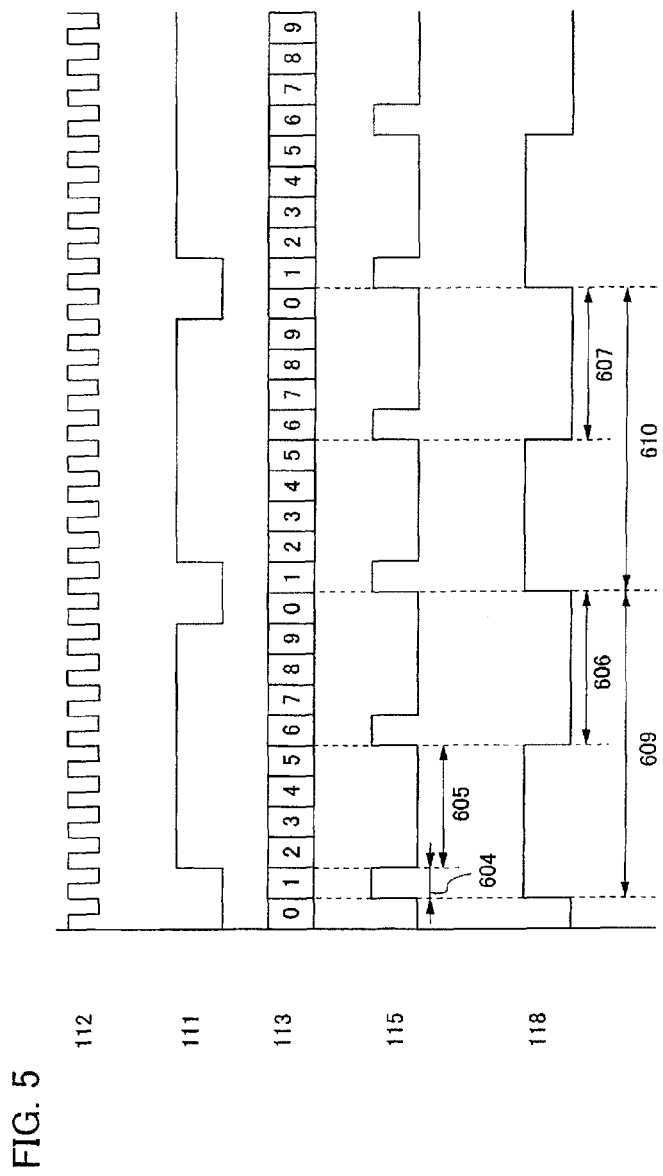
FIG. 5 is a timing chart of each signal in an operation of a clock signal generation circuit of Embodiment Mode 1.

Next, the case where the count value is 9 in the counter circuit 106 is shown in FIG. 5.

When the count value is 9, the clock signal 115 is generated on the basis of the count value and in accordance with data of a signal waveform of a duty ratio selected in the duty ratio selection circuit 107. In this case, the duty ratio (the ratio of a high period 604 to a low period 605) of the clock signal 115 is 1:4.

The control signal 118 is generated in the logic circuit 103, and is placed in a high state on an N-th (N is a natural number) rise of the clock signal 115 and placed in a low state on an (N+1)-th rise of the clock signal 115. In the control signal 118, at this time, the length of a low period 606 in an N-th (N is a natural number) signal cycle 609 is equal to that of a low period 607 in an (N+1)-th signal cycle 610.

Figure 6:
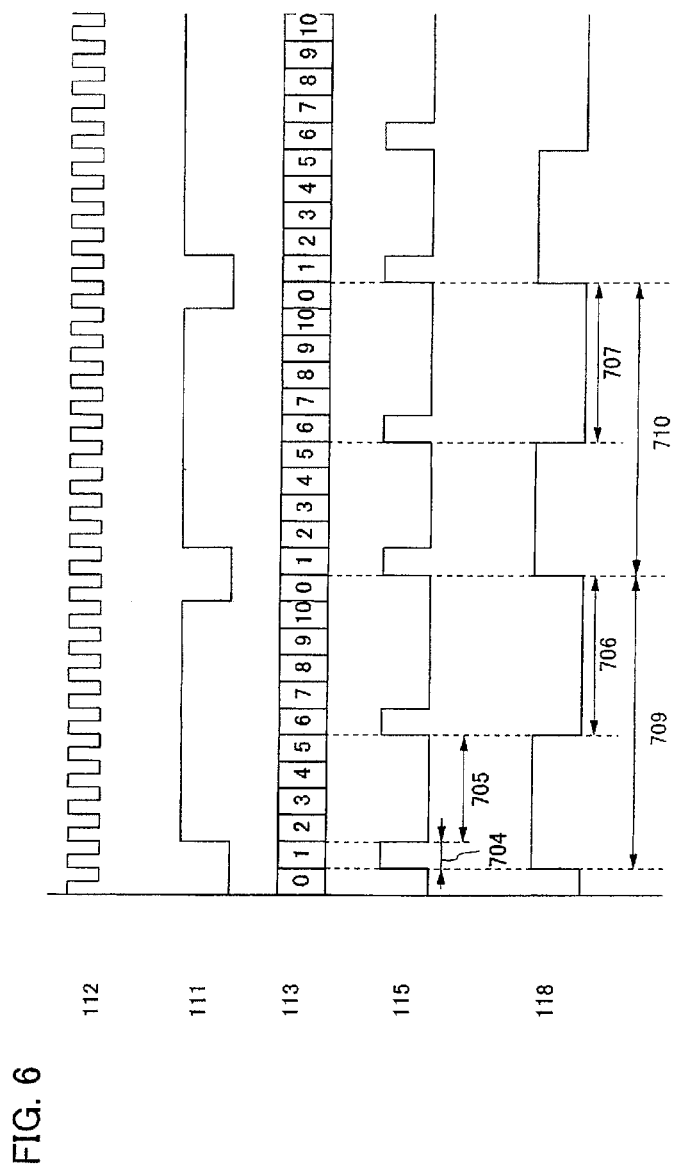
FIG. 6 is a timing chart of each signal in an operation of a clock signal generation circuit of Embodiment Mode 1.

Next, the case where the count value is 10 in the counter circuit 106 is shown in FIG. 6.

When the count value is 10, the clock signal 115 is generated on the basis of the count value and in accordance with data of a signal waveform of a duty ratio selected in the duty ratio selection circuit 107. In this case, the duty ratio (the ratio of a high period 704 to a low period 705) of the clock signal 115 is 1:4.

The control signal 118 is generated in the logic circuit 103, and is placed in a high state on an N-th (N is a natural number) rise of the clock signal 115 and placed in a low state on an (N+1)-th rise of the clock signal 115. In the control signal 118, at this time, the length of a low period 706 in an N-th (N is a natural number) signal cycle 709 is equal to that of a low period 707 in an (N+1)-th signal cycle 710.

As described above, even if the count value varies, with the use of a clock signal generation circuit of this embodiment mode, a clock signal can be generated by selecting an optimum duty ratio for each count value in the duty ratio selection circuit. Accordingly, even in the case where the reference clock signal has varied frequencies, an optimum clock signal can be generated with a small difference in the length of a low period of each cycle; further, with the use of the clock signal, an operation can be carried out on more precise timing in each of the circuits, so that misoperations can be reduced.

Further, a frequency of the reference clock signal for generating a clock signal can be set to be low and the reference clock signal generation circuit can be operated with low electric power, so that power consumption can be reduced.

Embodiment Mode 2

This embodiment mode describes an example where a two-phase clock signal is generated in a clock signal generation circuit in the case where a plurality of clock signals are generated. Description in Embodiment Mode 1 is also used here because a block diagram of a circuit structure is the same as FIG. 1 in Embodiment Mode 1.

An operation of a clock signal generation circuit of this embodiment mode is described with reference to FIGS. 1 and 2.

First, as a conversion process 201, an A/D conversion circuit 101 converts an analog signal input from a radio communication device or the like into a digital signal, and outputs the digital signal to an edge detection circuit 104.

Next, as an edge detection process 202, the edge detection circuit 104 detects an edge of the input digital signal, and a synchronization signal 111 is generated and output to a counter circuit 106. If any edge cannot be detected at this time, as a re-conversion process 203, a value of the counter circuit 106 is counted, and an analog signal is converted into a digital signal again in the A/D conversion circuit 101.

Next, as a count process 204, the counter circuit 106 counts the number of edges of a reference clock signal 112 input from a reference clock signal generation circuit 105. A count value in the counter circuit 106 is reset in accordance with the synchronization signal 111 input from the edge detection circuit 104, and a data signal of the count value from start of the counting to the reset is output to a duty ratio selection circuit 107.

Next, as a count value judgment process 205, the duty ratio selection circuit 107 judges the count value input from the counter circuit 106, selects data of a given duty ratio from data of signal waveforms of a plurality of duty ratios in accordance with the count value judged, and outputs the data of the given duty ratios to a frequency division circuit 108 as a data signal 114 of signal waveforms of the duty ratios. Note that this embodiment mode explains the case where the count value is any of 7 to 10. If the count value falls outside values which are set for judgment, the duty ratio selection circuit 107 cannot set a duty ratio; therefore, in such a case, as a re-conversion process 206, the A/D conversion circuit 101 converts an analog signal into a digital signal again.

Next, as a clock signal generation process 207, the frequency division circuit 108 divides the reference clock signal 112 in accordance with the input data signal 114 of the signal waveform, and generates a clock signal 115, which has the given duty ratio and the given number of edges. In this embodiment mode, the clock signal 115 generated is a two-phase clock signal including a first clock signal and a second clock signal that has an edge at a different position from the first clock signal; and the first clock signal and the second clock signal generated are output to a logic circuit 103.

Finally, as a control signal generation process 208, the logic circuit 103 generates a control signal which is placed in a high state on an N-th (N is a natural number) rise of the input first clock signal and placed in a low state on an N-th (N is a natural number) rise of the input second clock signal. Each circuit in the logic circuit 103 operates using this control signal.

This embodiment mode has described the case where the count value is any of 7 to 10. Also in the case where the count value has a value other than 7 to 10, however, a clock signal can be generated using a clock signal generation circuit of this embodiment mode if data stored in the duty ratio selection circuit 107 is changed in advance.

Now, timing of signals which are generated in the clock signal generation circuit of this embodiment mode in accordance with each count value is described with reference to FIGS. 7 to 10. FIGS. 7 to 10 show timing of the reference clock signal 112, the synchronization signal 111, a count value 113, a first clock signal 116, a second clock signal 117, and the control signal 118.

Figure 7:
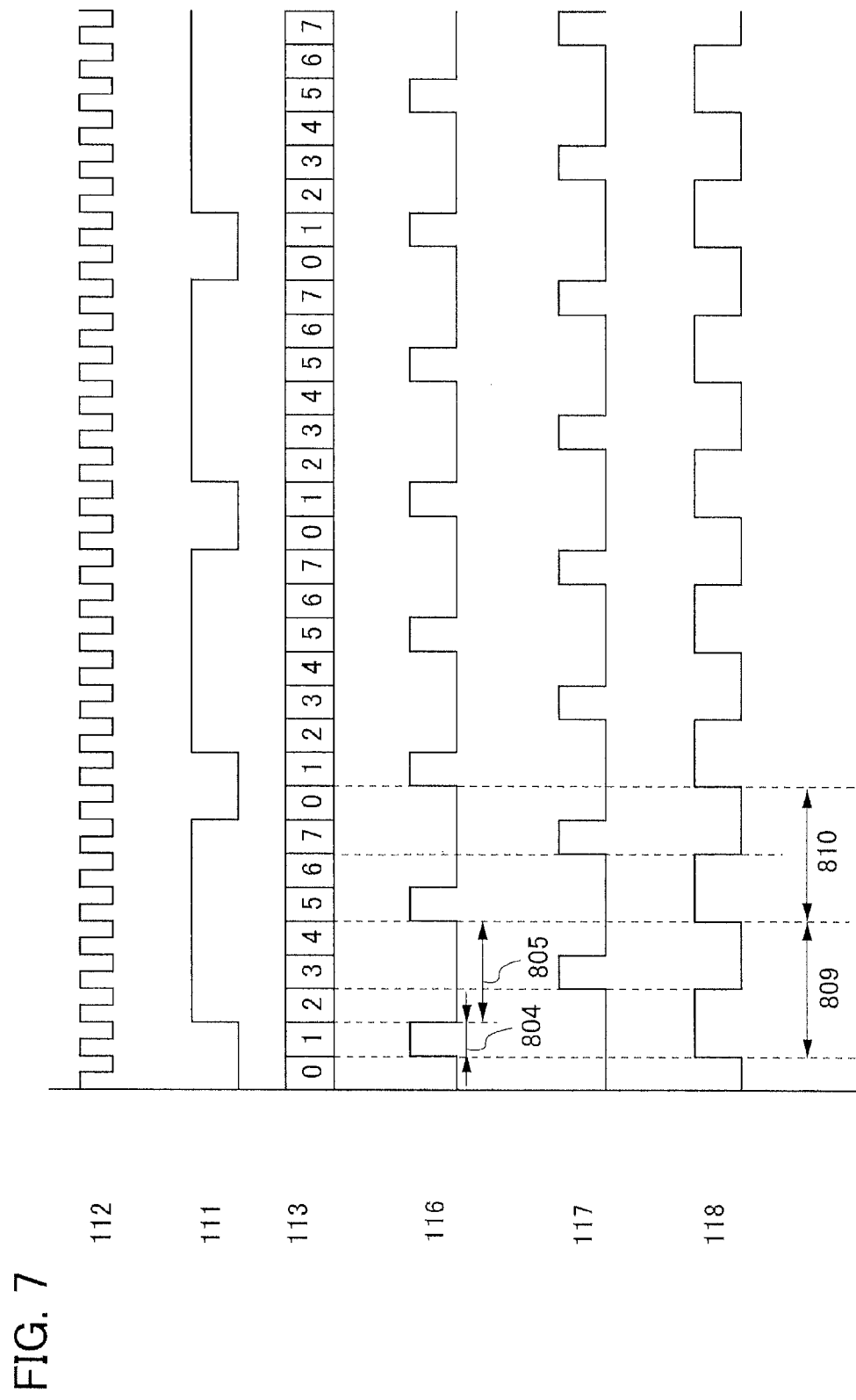
FIG. 7 is a timing chart of each signal in an operation of a clock signal generation circuit of Embodiment Mode 2.

First, the case where the count value is 7 in the counter circuit is shown in FIG. 7.

When the count value is 7, the first clock signal 116 and the second clock signal 117 are generated on the basis of the count value and in accordance with data of signal waveforms of first and second duty ratios selected in the duty ratio selection circuit 107. In this case, the first duty ratio (the ratio of a high period 804 to a low period 805) of the first clock signal 116 is 1:3, and the second duty ratio of the second clock signal 117 is also 1:3.

The control signal 118 is generated by the logic circuit 103, and is placed in a high state on an N-th (N is a natural number) rise of the first clock signal 116 and placed in a low state on an N-th rise of the second clock signal 117. In the control signal 118, at this time, an N-th (N is a natural number) signal cycle 809 is equal to an (N+1)-th signal cycle 810 in length.

Figure 8:
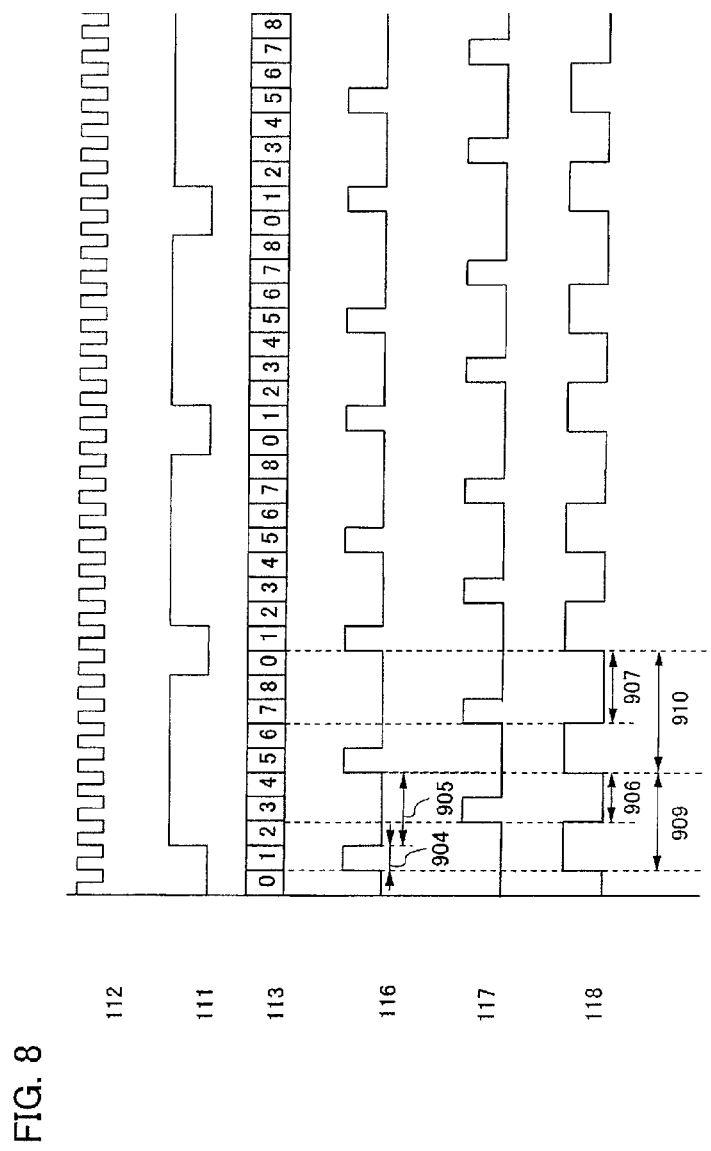
FIG. 8 is a timing chart of each signal in an operation of a clock signal generation circuit of Embodiment Mode 2.

Next, the case where the count value is 8 in the counter circuit 106 is shown in FIG. 8.

When the count value is 8, the first clock signal 116 and the second clock signal 117 are generated on the basis of the count value and in accordance with data of signal waveforms of first and second duty ratios selected in the duty ratio selection circuit 107. In this case, the first duty ratio (the ratio of a high period 904 to a low period 905) of the first clock signal 116 is 1:3 and the second duty ratio of the second clock signal 117 is also 1:3.

The control signal 118 is generated in the logic circuit 103, and is placed in a high state on an N-th (N is a natural number) rise of the first clock signal 116 and placed in a low state on an N-th (N is a natural number) rise of the second clock signal 117. In the control signal 118, at this time, the length of an N-th (N is a natural number) signal cycle 909 is different from that of an (N+1)-th signal cycle 910, and a low period 907 in the signal cycle 910 is 1.25 times longer than a low period 906 in the signal cycle 909.

Figure 9:
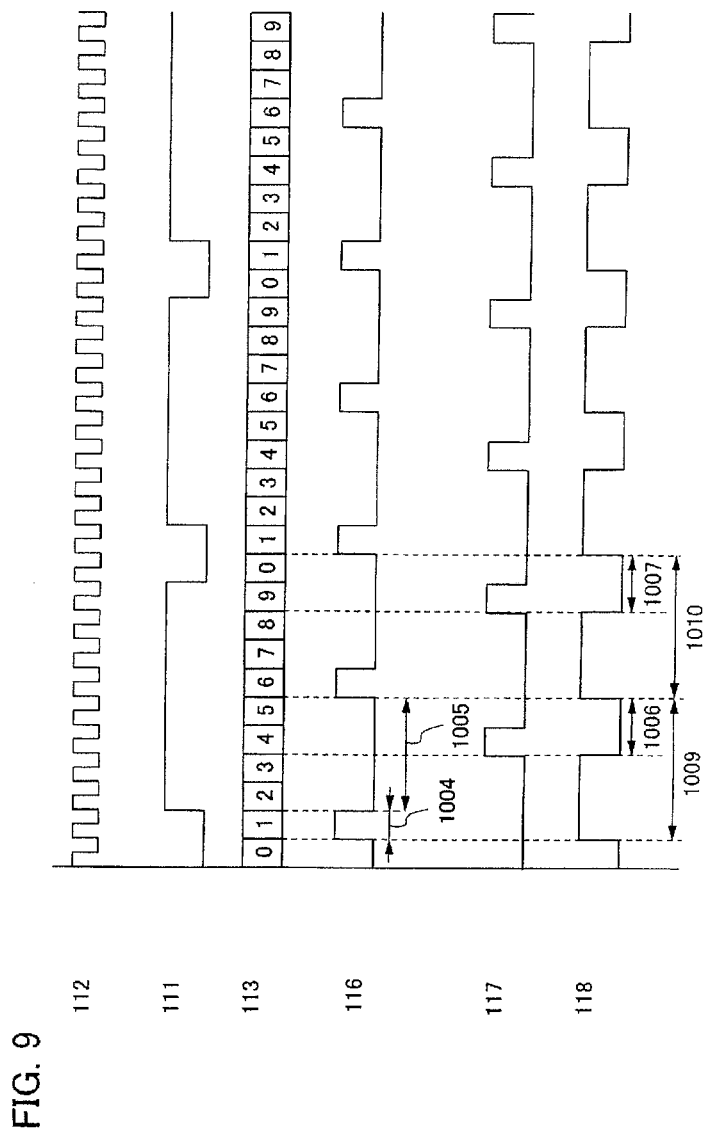
FIG. 9 is a timing chart of each signal in an operation of a clock signal generation circuit of Embodiment Mode 2.

Next, the case where the count value is 9 in the counter circuit 106 is shown in FIG. 9.

The first clock signal 116 and the second clock signal 117 are generated on the basis of the count value and in accordance with data of a signal waveforms of first and second duty ratios selected in the duty ratio selection circuit 107. In this case, the first duty ratio (the ratio of a high period 1004 to a low period 1005) of the first clock signal 116 is 1:4, and the second duty ratio of the second clock signal 117 is also 1:4.

The control signal 118 is generated in the logic circuit 103, and is placed in a high state on an N-th (N is a natural number) rise of the first clock signal 116 and placed in a low state on an N-th (N is a natural number) rise of the second clock signal 117. In the control signal 118, at this time, the length of a low period 1006 in an N-th (N is a natural number) signal cycle 1009 is equal to that of a low period 1007 in an (N+1)-th signal cycle 1010.

Figure 10:
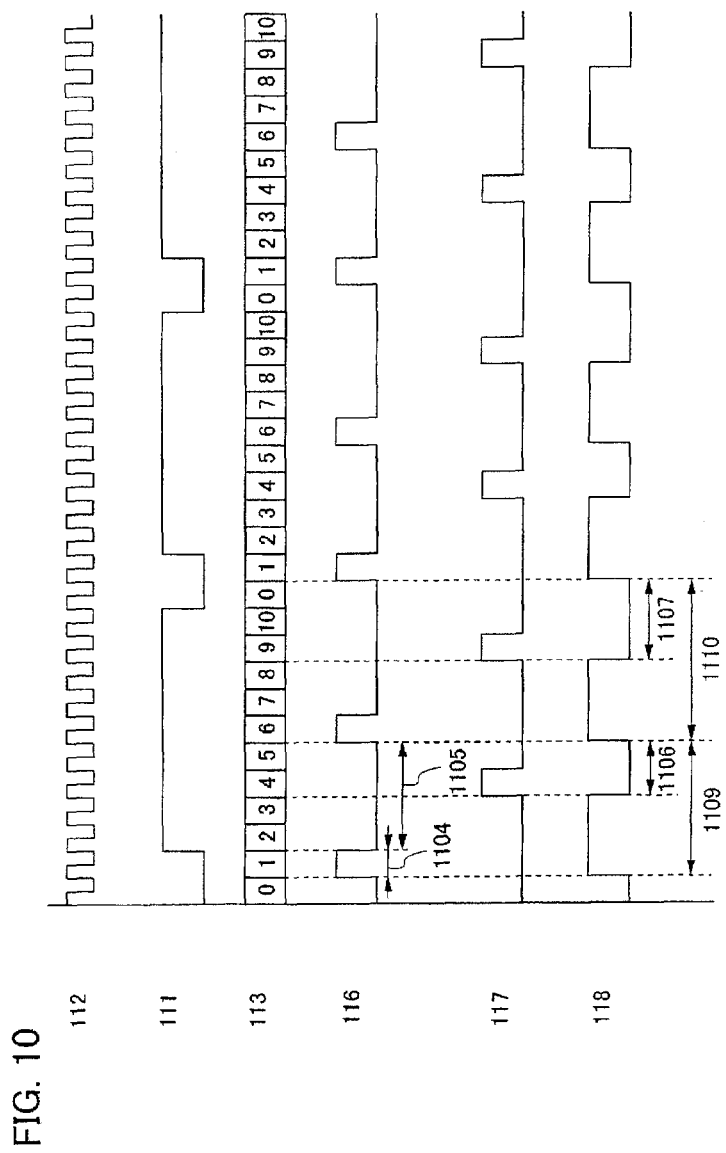
FIG. 10 is a timing chart of each signal in an operation of a clock signal generation circuit of Embodiment Mode 2.
Figure 11:
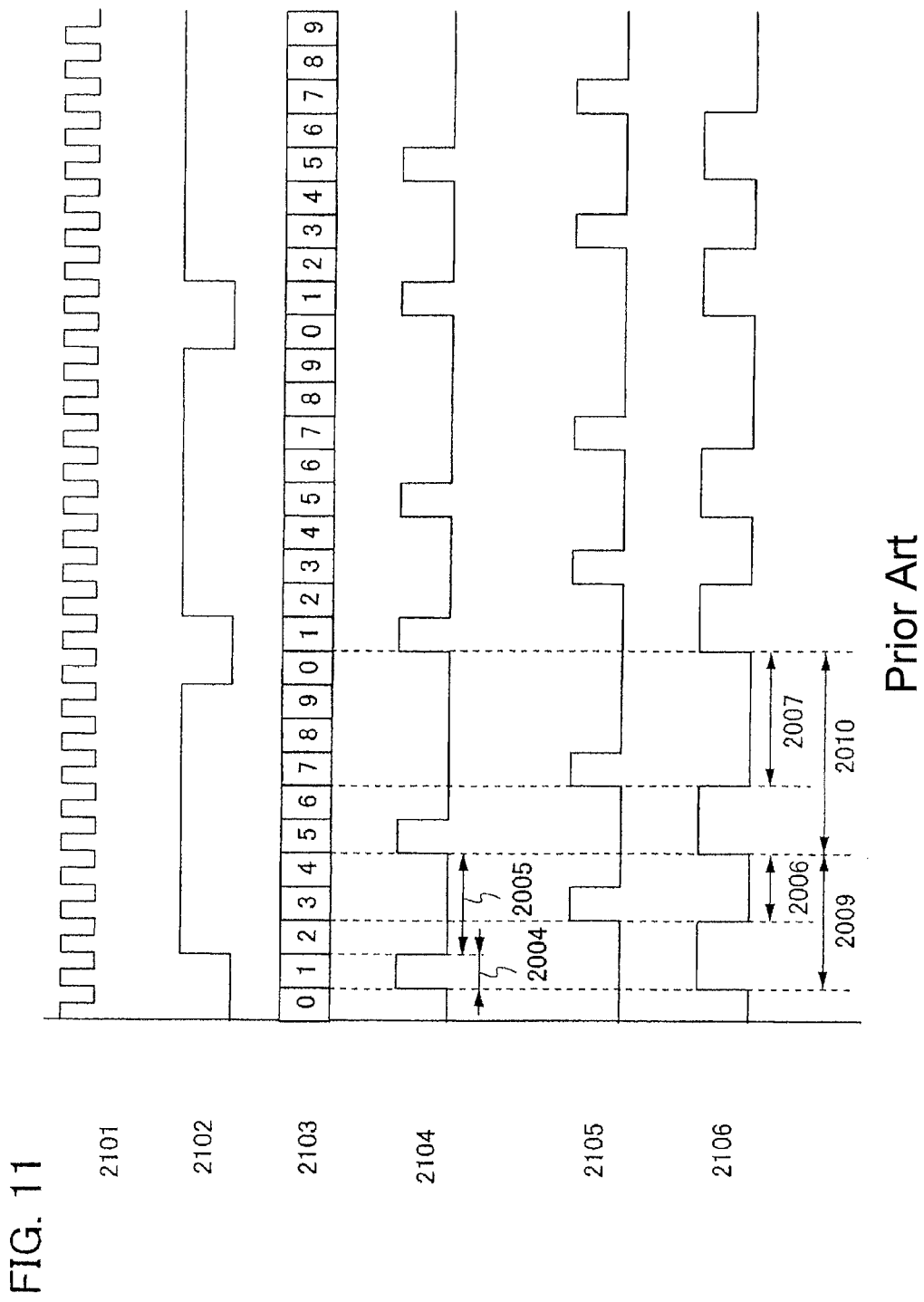
FIG. 11 is a timing chart in an operation of a conventional clock signal generation circuit.

Next, the case where the count value is 10 in the counter circuit 106 is shown in FIG. 10.

When the count value is 10, the first clock signal 116 and the second clock signal 117 are generated on the basis of the count value and in accordance with data of signal waveforms of first and second duty ratio selected in the duty ratio selection circuit 107. In this case, the first duty ratio (the ratio of a high period 1104 to a low period 1105) of the first clock signal 116 is 1:4 and the second duty ratio of the second clock signal 117 is also 1:4.

The control signal 118 is generated in the logic circuit 103, and is placed in a high state on an N-th (N is a natural number) rise of the first clock signal 116 and placed in a low state on an N-th (N is a natural member) rise of the second clock signal 117. In the control signal 118, at this time, the length of an N-th (N is a natural number) signal cycle 1109 is different from that of an (N+1)-th signal cycle 1110, and a low period 1107 in the signal cycle 1110 is 1.25 times longer than a low period 1106 in the signal cycle 1109.

As described above, even if the count value varies, with the use of a clock signal generation circuit of this embodiment mode, a clock signal can be generated by selecting an optimum duty ratio for each count value in the duty ratio selection circuit. Accordingly, even in the case where the reference clock signal has varied frequencies, an optimum clock signal with a small difference in the length of a low period of each cycle can be generated.

Further, if a plurality of clock signals of two or more phases are generated, both a high period and a low period can be controlled; therefore, with the use of the above clock signal, an operation can be carried out on more precise timing in each of the circuits, so that misoperations can be reduced.

Further, a frequency of the reference clock signal for generating a clock signal can be set to be low and the reference clock signal generation circuit can be operated with low electric power, so that power consumption can be reduced.

Embodiment Mode 3

This embodiment mode describes a semiconductor device provided with the clock signal generation circuit shown in Embodiment Mode 1 or 2.

Figure 12:
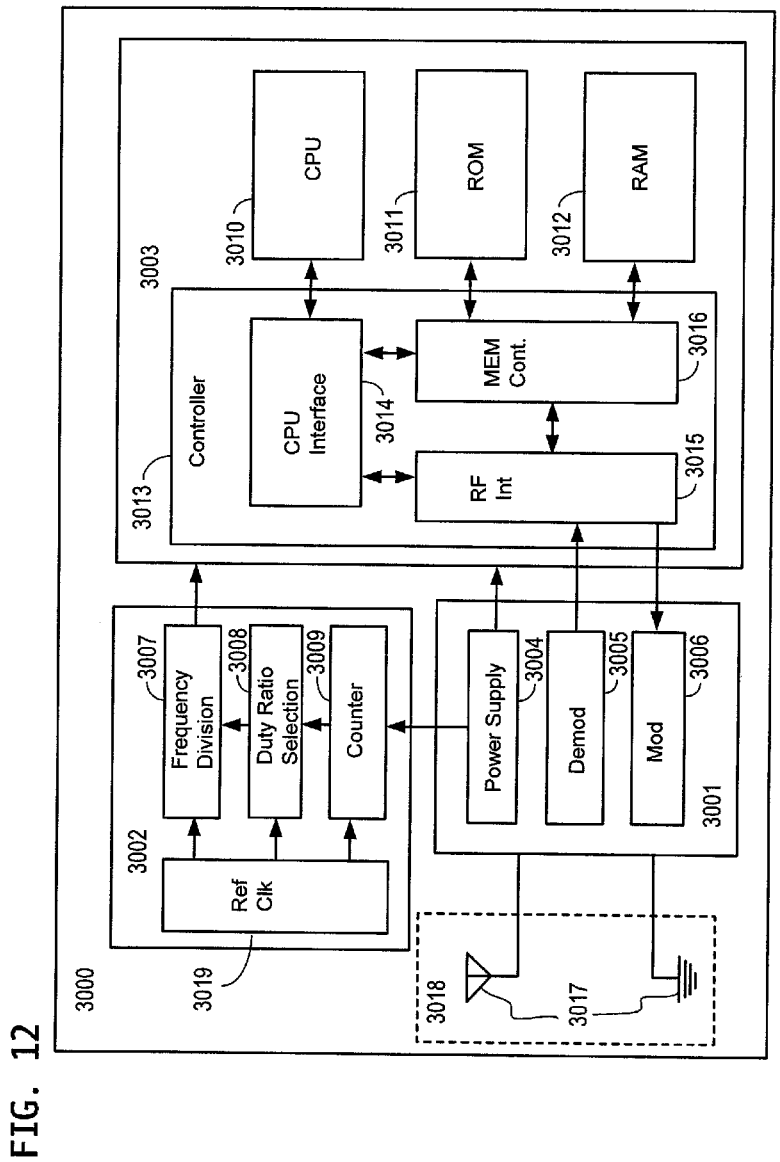
FIG. 12 is a block diagram of a semiconductor device including a clock signal generation circuit of Embodiment Mode 3 of the present invention.

A configuration of a semiconductor device of this embodiment mode is shown in FIG. 12. A semiconductor device 3000 includes an RF circuit 3001, a clock signal generation circuit 3002, a logic circuit 3003, and an antenna 3017 in an antenna portion 3018. Although not shown in FIG. 12, the semiconductor device 3000 transmits and receives a radio signal to/from an external circuit of a radio communication device or the like through the antenna 3017.

Next, a configuration of each circuit is described. The RF circuit 3001 includes a power supply circuit 3004, a demodulation circuit 3005, and a modulation circuit 3006. The clock signal generation circuit 3002 includes a frequency division circuit 3007, a duty ratio selection circuit 3008, a counter circuit 3009, and a reference clock signal generation circuit 3019. The logic circuit 3003 includes a controller 3013, a CPU (also referred to as a central processing unit) 3010, a ROM (read-only memory) 3011, and a RAM (random access memory) 3012.

Further, the controller 3013 includes a CPU interface 3014, an RF interface 3015, and a memory controller 3016.

In the RF circuit 3001, the power supply circuit 3004 includes a rectifier circuit and a storage capacitor, and has a function of generating power source voltage and supplying the power source voltage to other circuits. The demodulation circuit 3005 includes a rectifier circuit and an LPF (low-pass filter), and has a function of extracting a command or data from a communication signal. The modulation circuit 3006 has a function of modulating transmission data, and modulated data is transmitted as a transmission signal from the antenna 3017.

Now, an operation of the semiconductor device of this embodiment mode is described. First, the semiconductor device 3000 receives a reception signal transmitted from an external communication device. The reception signal is demodulated in the demodulation circuit 3005, and then is input into the RF interface 3015 in the controller 3013. The reception signal input to the RF interface 3015 is arithmetically processed in the CPU 3010 through the CPU interface 3014. Further, access to the ROM 3011 and the RAM 3012 through the memory controller 3016 is carried out by the reception signal input to the RF interface 3015.

Then, after the arithmetic operation in the CPU 3010 and data input/output in the ROM 3011 and the RAM 3012, transmission data is generated, and modulated in the modulation circuit 3006, and a transmission signal is transmitted from the antenna 3017 to a communication device.

Even if a reference clock signal has varied frequencies, with the use of a semiconductor device provided with a clock signal generation circuit of the present invention as described above, an optimum clock signal can be generated in accordance with variations, and an operation of each circuit on the basis of a clock signal in the semiconductor device can be carried out on more precise timing, so that misoperations can be reduced.

In the semiconductor device of the present invention, further, a frequency of the reference clock signal for generating a clock signal can be set to be low and the reference clock signal generation circuit can be operated with low electric power, so that power consumption can be reduced.

Embodiment Mode 4

This embodiment mode describes an example of a method for manufacturing a semiconductor device shown in the above embodiment modes. This embodiment mode describes an example in which a semiconductor device including an antenna circuit is provided over one substrate.

First, as shown in FIG. 13A, a separation layer 1903 is formed over a surface of a substrate 1901 with an insulating film 1902 interposed therebetween. Next, an insulating film 1904 which serves as a base film and a semiconductor film 1905 (e.g. a film containing amorphous silicon) are stacked. The insulating film 1902, the separation layer 1903, the insulating film 1904, and the semiconductor film 1905 can be formed in succession.

The substrate 1901 is selected from a glass substrate, a quartz substrate, a ceramic substrate, a metal substrate (e.g. a stainless steel substrate), a semiconductor substrate such as a Si substrate, and the like. Alternatively, a plastic substrate of polyethylene terephthalate (PET), polyethylene naphthalate (PEN), polyether sulfone (PES), acrylic, or the like can be used. In a manufacturing method of a semiconductor device of this embodiment mode, the separation layer 1903 is provided over an entire surface of the substrate 1901 with the insulating film 1902 interposed therebetween; however, if necessary, the separation layer may be provided selectively by a photolithography method after providing the separation layer over an entire surface of the substrate 1901.

The insulating film 1902 and the insulating film 1904 can be formed using a material such as silicon oxide, silicon nitride, silicon oxynitride ($SiO_xN_y$, where x>y>0), or silicon nitride oxide ($SiN_xO_y$, where x>y>0), by a CVD method, a sputtering method, or the like. For example, when the insulating film 1902 and the insulating film 1904 each have a two-layer structure, it is preferable that a silicon nitride oxide film be formed as a first insulating film and a silicon oxynitride film be formed as a second insulating film. Alternatively, a silicon nitride film may be formed as a first insulating film and a silicon oxide film may be formed as a second insulating film. The insulating film 1902 serves as a blocking layer which prevents an impurity element from the substrate 1901 from being mixed into the separation layer 1903 or an element formed thereover. The insulating film 1904 serves as a blocking layer which prevents an impurity element from the substrate 1901 or the separation layer 1903 from being mixed into an element formed thereover. By forming the insulating films 1902 and 1904 which serve as blocking layers in this manner, an element formed over the separation layer 1903 can be prevented from being adversely affected by an alkali metal (e.g. Na) or an alkaline earth metal from the substrate 1901, or an impurity element included in the separation layer 1903. If a quartz substrate is used as the substrate 1901, the insulating films 1902 and 1904 may be omitted from the structure.

As the separation layer 1903, a metal film, a stacked-layer structure including a metal film and a metal oxide film, or the like can be used. As the metal film, a single-layer structure or a stacked-layer structure can be formed using a film formed of any of the elements: tungsten, molybdenum, titanium, tantalum, niobium, nickel, cobalt, zirconium, zinc, ruthenium, rhodium, palladium, osmium, and iridium; or a film of an alloy material or a compound material containing such an element as a main constituent. These materials can be formed by a sputtering method, a variety of CVD methods such as a plasma CVD method, or the like. As a stacked-layer structure including a metal film and a metal oxide film, after the aforementioned metal film is formed, plasma treatment in an oxygen atmosphere or an $N_2O$ atmosphere, or heat treatment in an oxygen atmosphere or an nitrogen oxide atmosphere is performed, so that an oxide or an oxynitride of the metal film can be formed on a surface of the metal film. For example, if a tungsten film is formed as the metal film by a sputtering method, a CVD method, or the like, plasma treatment is performed on the tungsten film, so that a metal oxide film formed of tungsten oxide can be formed on a surface of the tungsten film. Alternatively, for example, such a structure may be employed: after forming a metal film (e.g. of tungsten), an insulating film of silicon oxide or the like is provided over the metal film by a sputtering method, and a metal oxide is formed between the metal film and the insulating film (e.g. tungsten oxide over tungsten) by plasma treatment or heat treatment. In addition to a metal oxide film, a metal nitride or a metal oxynitride may also be used. In this case, a metal film may be subjected to plasma treatment or heat treatment in a nitrogen atmosphere or an atmosphere of nitrogen and oxygen.

The semiconductor film 1905 is formed with a thickness of 25 to 200 nm inclusive (preferably, 30 to 150 nm inclusive) by a sputtering method, an LPCVD method, a plasma CVD method, or the like.

Next, as shown in FIG. 13B, the semiconductor film 1905 is crystallized by being irradiated with a laser beam. The semiconductor film 1905 may be crystallized by a method which combines laser beam irradiation with a thermal crystallization method which employs RTA or an annealing furnace or a thermal crystallization method which employs a metal element for promoting crystallization, or the like. Subsequently, the obtained crystalline semiconductor film is etched into a desired shape to form crystallized crystalline semiconductor films 1905a to 1905f, and a gate insulating film 1906 is formed so as to cover the semiconductor films 1905a to 1905f.

The gate insulating film 1906 is formed using a material such as silicon oxide, silicon nitride, silicon oxynitride, or silicon nitride oxide, by a CVD method, a sputtering method, or the like. For example, if the gate insulating film 1906 has a two-layer structure, it is preferable that a silicon oxynitride film be formed as a first insulating film and a silicon nitride oxide film be formed as a second insulating film. Alternatively, a silicon oxide film may be formed as the first insulating film and a silicon nitride film may be formed as the second insulating film.

An example of manufacturing steps of the crystallized semiconductor films 1905*a* to 1905*f* is briefly described below. First an amorphous semiconductor film with a thickness of 50 to 60 μm inclusive is formed by a plasma CVD method. Next, a solution containing nickel, which is a metal element for promoting crystallization, is retained on the amorphous semiconductor film, and then dehydrogenation treatment (at 500° C., for one hour) and thermal crystallization treatment (at 550° C., for four hours) are performed on the amorphous semiconductor film to form a crystalline semiconductor film. Subsequently, the crystalline semiconductor film is irradiated with a laser beam, and the crystalline semiconductor films 1905*a* to 1905*f* are formed by a photolithography method. The amorphous semiconductor film may be crystallized just by laser beam irradiation, without performing thermal crystallization which employs a metal element for promoting crystallization.

As a laser oscillator for crystallization, a continuous wave laser beam (a CW laser beam) or a pulsed wave laser beam (a pulsed laser beam) can be used. As a laser beam which can be used here, a laser beam emitted from one or more of the following can be used: a gas laser, such as an Ar laser, a Kr laser, or an excimer laser; a laser whose medium is single crystalline YAG, YVO$_4$, forsterite (Mg$_2$SiO$_4$), YAlO$_3$, or GdVO$_4$, to which one or more of Nd, Yb, Cr, Ti, Ho, Er, Tm, and Ta has been added as a dopant; a laser whose medium is polycrystalline (ceramic) YAG, Y$_2$O$_3$, YVO$_4$, YAlO$_3$, or GdVO$_4$, to which one or more of Nd, Yb, Cr, Ti, Ho, Er, Tm, and Ta has been added as a dopant; a glass laser; a ruby laser; an alexandrite laser; a Ti:sapphire laser; a copper vapor laser; or a gold vapor laser. Crystals with a large grain size can be obtained by irradiation with fundamental waves of such laser beams or second to fourth harmonics of the fundamental waves. For example, the second harmonic (532 nm) or the third harmonic (355 nm) of an Nd:YVO$_4$ laser (a fundamental wave of 1064 nm) can be used. In this case, a power density of approximately 0.01 to 100 MW/cm$^2$ inclusive (preferably, 0.1 to 10 MW/cm$^2$ inclusive) is necessary for the laser. Irradiation is conducted with a scanning rate of approximately 10 to 2000 cm/sec inclusive. A laser using, as a medium, single crystalline YAG, YVO$_4$, forsterite (Mg$_2$SiO$_4$), YAlO$_3$, or GdVO$_4$, to which one or more of Nd, Yb, Cr, Ti, Ho, Er, Tm, and Ta has been added as a dopant, or polycrystalline (ceramic) YAG, Y$_2$O$_3$, YVO$_4$, YAlO$_3$, or GdVO$_4$, to which one or more of Nd, Yb, Cr, Ti, Ho, Er, Tin, and Ta has been added as a dopant; an Ar ion laser; or a Ti:sapphire laser can be continuously oscillated. Furthermore, pulse oscillation thereof can be performed at a repetition rate of 10 MHz or more by performing mode locking or the like. When a laser beam is oscillated at a repetition rate of 10 MHz or more, during the time in which a semiconductor film is melted by the laser beam and then solidifies, the semiconductor film is irradiated with a next pulse. Accordingly, unlike in a case of using a pulsed laser with a low repetition rate, a solid-liquid interface can be continuously moved in the semiconductor film; therefore, crystal grains which have grown continuously in a scanning direction can be obtained.

Further, high-density plasma treatment may be performed on the semiconductor films 1905*a* to 1905*f* to oxidize or nitride surfaces thereof, to form the gate insulating film 1906. For example, the gate insulating film 1906 is formed by plasma treatment in which a mixed gas of a rare gas such as He, Ar, Kr, or Xe, and oxygen, nitrogen oxide, ammonia, nitrogen, hydrogen, or the like, is introduced. When excitation of the plasma in this case is performed by introduction of a microwave, plasma with a low electron temperature and high density can be generated. The surface of the semiconductor film can be oxidized or nitrided by oxygen radicals (OH radicals are included in some cases) or nitrogen radicals (NH radicals are included in some cases) generated by this high-density plasma.

By treatment using such high-density plasma, an insulating film with a thickness of 1 to 20 nm inclusive, typically 5 to 10 nm inclusive, is formed over the semiconductor film. Because the reaction in this case is a solid-phase reaction, interface state density between the insulating film and the semiconductor film can be made highly low. The insulating film can be formed with highly little variation in the thickness because such high-density plasma treatment oxidizes (or nitrides) a semiconductor film (crystalline silicon, or polycrystalline silicon) directly. In addition, crystal grain boundaries of crystalline silicon are not strongly oxidized, and thus have highly favorable conditions. That is, by the solid-phase oxidation of the surface of the semiconductor film by the high-density plasma treatment shown here, an insulating film with good uniformity and low interface state density can be formed without excessive oxidation at crystal grain boundaries.

As the gate insulating film 1906, just an insulating film formed by the high-density plasma treatment may be used, or any one or more of the following insulating films may be stacked thereover: a film of silicon oxide, silicon oxynitride, and silicon nitride, by a CVD method which employs plasma or a thermal reaction. In any case, when transistors include an insulating film formed by high-density plasma in a part or the whole of a gate insulating film, variations in characteristics can be reduced.

Furthermore, in the semiconductor films 1905*a* to 1905*f* that are obtained by crystallizing a semiconductor film by irradiation with a continuous wave laser beam or a laser beam oscillated at a repetition rate of 10 MHz or more which is scanned in one direction, crystals grow in the scanning direction of the beam. When transistors are disposed so that the scanning direction is aligned with the channel length direction (the direction in which a carrier flows when a channel formation region is formed) and the above-described gate insulating film 1906 is used in combination with the transistors, transistors with little variation in characteristics and high electric field-effect mobility can be obtained.

Next, a first conductive film and a second conductive film are stacked over the gate insulating film 1906. In this embodiment mode, the first conductive film is formed with a thickness of 20 to 100 nm inclusive using a CVD method, a sputtering method, or the like. The second conductive film is formed with a thickness of 100 to 400 nm inclusive. The first conductive film and the second conductive film can be formed using an element such as tantalum, tungsten, titanium, molybdenum, aluminum, copper, chromium, or niobium, or using an alloy material or a compound material containing such an element as its main constituent. Alternatively, the first conductive film and the second conductive film can be formed using a semiconductor material typified by polycrystalline silicon doped with an impurity element such as phosphorus. As examples of a combination of the first conductive film and the second conductive film, a tantalum nitride film and a tungsten film, a tungsten nitride film and a tungsten film, a molybdenum nitride film and a molybdenum film, and the like can be given. Because tungsten and tantalum nitride have high heat resistance, heat treatment for thermal activation can be performed after the first conductive film and the second conductive film are formed. In the case of using a three-layer structure instead of a two-layer structure, a stacked-layer structure including a molybdenum film, an aluminum film, and a molybdenum film is preferably used.

Next, a resist mask is formed using a photolithography method, and etching treatment for forming a gate electrode and a gate line is conducted, so that gate electrodes 1907 are formed over the semiconductor films 1905a to 1905f. In this embodiment mode, an example in which the gate electrodes 1907 have a stacked-layer structure which includes a first conductive film 1907a and a second conductive film 1907b is described.

Next, as shown in FIG. 13C, the gate electrodes 1907 are used as masks, and an impurity element imparting n-type conductivity is added to the semiconductor films 1905a to 1905f at a low concentration by an ion doping method or an ion implantation method. Subsequently, a resist mask is selectively formed by a photolithography method, and an impurity element imparting p-type conductivity is added at a high concentration. As an impurity element which exhibits n-type conductivity, phosphorus, arsenic, or the like can be used. As an impurity element which exhibits p-type conductivity, boron, aluminum, gallium, or the like can be used. Here, phosphorus is used as an impurity element which imparts n-type conductivity, and is selectively introduced into the semiconductor films 1905a to 1905f such that they contain phosphorus at a concentration of $1\times10^{15}$ to $1\times10^{19}/cm^3$ inclusive. Thus, n-type impurity regions 1908 are formed. Further, boron is used as an impurity element which imparts p-type conductivity, and is selectively introduced into the semiconductor films 1905c and 1905e such that they contain boron at a concentration of $1\times10^{19}$ to $1\times10^{20}/cm^3$ inclusive. Thus, p-type impurity regions 1909 are formed.

Next, an insulating film is formed so as to cover the gate insulating film 1906 and the gate electrodes 1907. The insulating film is formed as a single layer or stacked layers of one or plural kinds of films containing an inorganic material such as silicon, an oxide of silicon, or a nitride of silicon, or films containing an organic material such as an organic resin, by a plasma CVD method, a sputtering method, or the like. Next, the insulating film is selectively etched using anisotropic etching in which etching proceeds mainly in a vertical direction, to form insulating films 1910 (also referred to as sidewalls) that are in contact with side surfaces of the gate electrodes 1907. The insulating films 1910 are used as masks for doping when LDD (lightly doped drain) regions are formed.

Next, using a resist mask formed by a photolithography method, the gate electrodes 1907, and the insulating films 1910 as masks, an impurity element which imparts n-type conductivity is added at a high concentration to the semiconductor films 1905a, 1905b, 1905d, and 1905f, to form n-type impurity regions 1911. Here, phosphorus is used as an impurity element which imparts n-type conductivity, and is selectively introduced into the semiconductor films 1905a, 1905b, 1905d, and 1905f such that they contain phosphorus at a concentration of $1\times10^{19}$ to $1\times10^{20}/cm^3$ inclusive. Thus, the n-type impurity regions 1911, which have a higher concentration than the impurity regions 1908, are formed.

By the above-described steps, n-channel thin film transistors 1900a, 1900b, 1900d, and 1900f, and p-channel thin film transistors 1900c and 1900e are formed, as shown in FIG. 13D.

In the thin film transistor 1900a, a channel formation region is formed in a region of the semiconductor film 1905a which overlaps with the gate electrode 1907; the impurity regions 1911 which each form a source region or a drain region are formed in regions which do not overlap with the gate electrode 1907 and the insulating films 1910; and lightly doped drain regions (LDD regions) are formed in regions which overlap with the insulating films 1910 and are between the channel formation region and the impurity regions 1911. Further, the thin film transistors 1900b, 1900d, and 1900f are similarly provided with channel formation regions, lightly doped drain regions, and impurity regions 1911.

Further, in the thin film transistor 1900c, a channel formation region is formed in a region of the semiconductor film 1905c which overlaps with the gate electrode 1907, and the impurity regions 1909 which each form a source region or a drain region are formed in regions which do not overlap with the gate electrode 1907. Further, the thin film transistor 1900e is similarly provided with a channel formation region and the impurity regions 1909. Here, the thin film transistors 1900c and 1900e are not provided with LDD regions; however, the thin film transistors 1900e and 1900e may be provided with an LDD region, and the thin film transistors 1900a and 1900b are not necessarily provided with an LDD region.

Next, as shown in FIG. 14A, an insulating film is formed as a single layer or stacked layers so as to cover the semiconductor films 1905a to 1905f; the gate electrodes 1907, and the like; then, conductive films 1913 are formed over the insulating film so as to be in contact with parts of the impurity regions 1909 and 1911 that form the source regions or the drain regions of the thin film transistors 1900a to 1900f. The insulating film is formed as a single layer or stacked layers by a CVD method, a sputtering method, an SOG method, a droplet discharge method, a screen printing method, or the like, using one or plural kinds of the following: an inorganic material, such as an oxide of silicon or a nitride of silicon; an organic material, such as polyimide, polyamide, benzocyclobutene, acrylic, or epoxy; or a siloxane material. Here, the insulating film has a two-layer structure including a silicon nitride oxide film as a first insulating film 1912a and a silicon oxynitride film as a second insulating film 1912b. Further, the conductive films 1913 function as source electrodes or drain electrodes of the semiconductor films 1905a to 1905f.

Before the insulating films 1912a and 1912b are formed or after one or more thin films of the insulating films 1912a and 1912b are formed, heat treatment is preferably conducted for recovering the crystallinity of the semiconductor film, for activating an impurity element which has been added to the semiconductor film, or for hydrogenating the semiconductor film. As the heat treatment, thermal annealing, a laser annealing method, an RTA method, or the like is preferably used.

The conductive films 1913 are formed as a single layer or stacked layers by a CVD method, a sputtering method, or the like, using any of the elements: aluminum, tungsten, titanium, tantalum, molybdenum, nickel, platinum, copper, gold, silver, manganese, neodymium, carbon, and silicon; or an alloy material or a compound material containing one of the above-mentioned elements as its main constituent. As an alloy material containing aluminum as its main constituent, for example, a material which contains aluminum as its main constituent and also contains nickel, or an alloy material which contains aluminum as its main constituent and also contains nickel and one or both of carbon and silicon can be used. The conductive films 1913 preferably employ, for example, a stacked-layer structure including a barrier film, an aluminum-silicon (Al—Si) film, and a barrier film, or a stacked-layer structure including a barrier film, an aluminum-silicon film, a titanium nitride film, and a barrier film. Note that a barrier film corresponds to a thin film formed of titanium, a nitride of titanium, molybdenum, or a nitride of molybdenum. Aluminum and aluminum silicon, which have low resistance and are inexpensive, are ideal materials for forming the conductive films 1913. Further, generation of a hillock of aluminum or aluminum silicon can be prevented when upper and lower barrier layers are formed. Furthermore, when the barrier film is formed of titanium, which is a highly-reducible element, even if a thin natural oxide film is formed over the crystalline semiconductor film, the natural oxide film is chemically reduced, so that good contact with the crystalline semiconductor film can be obtained.

Next, an insulating film 1914 is formed so as to cover the conductive films 1913, and conductive films 1915*a* and 1915*b* are formed over the insulating film 1914 so as to be in contact with parts of the conductive films 1913 which function as source electrodes or drain electrodes of the semiconductor films 1905*a* and 1905*f*. Further, conductive films 1916*a* and 1916*b* are formed so as to be in contact with parts of the conductive films 1913 which function as source electrodes or drain electrodes of the semiconductor films 1905*b* and 1905*e*. The conductive films 1915*a* and 1915*b* may be formed of the same material as that of the conductive films 1916*a* and 1916*b*. The conductive films 1915*a* and 1915*b* and the conductive films 1916*a* and 1916*b* can be formed using any of the above-mentioned materials that the conductive films 1913 can be formed of.

Next, as shown in FIG. 14B, conductive films 1917*a* and 1917*b* which serve as antennas are formed so as to be electrically connected to the conductive films 1916*a* and 1916*b*.

Note that the insulating film 1914 can be provided by a CVD method, a sputtering method, or the like as a single-layer structure or a stacked-structure of an insulating film containing oxygen and/or nitrogen, such as silicon oxide, silicon nitride, silicon oxynitride, or silicon nitride oxide; a film containing carbon, such as DLC (diamond-like carbon); a film of an organic material, such as epoxy, polyimide, polyamide, polyvinyl phenol, benzocyclobutene, or acrylic; or a film of a siloxane material, such as a siloxane resin. A siloxane material corresponds to a material having a Si—O—Si bond. Siloxane has a skeleton structure formed from bonds of silicon and oxygen. As a substituent, an organic group containing at least hydrogen (e.g. an alkyl group or aromatic hydrocarbon) is used. A fluoro group can also be used as a substituent. Alternatively, an organic group containing at least hydrogen and a fluoro group may be used as a substituent.

The conductive films 1917*a* and 1917*b* are formed using a conductive material, by a CVD method, a sputtering method, a printing method such as a screen printing method or a gravure printing method, a droplet discharge method, a dispensing method, a plating method, or the like. The conductive material is any of the following elements: aluminum, titanium, silver, copper, gold, platinum, nickel, palladium, tantalum, and molybdenum, or an alloy material or a compound material containing one of the above-mentioned elements as its main constituent; and has a single-layer structure or a stacked-layer structure.

For example, in the case of using a screen printing method to form the conductive films 1917*a* and 1917*b* which serve as antennas, the conductive films 1917*a* and 1917*b* can be provided by selectively printing a conductive paste in which conductive particles having a grain size of several nm to several tens of μm are dissolved or dispersed in an organic resin. The conductive particles can be fine particles or dispersive nanoparticles of one or more of metals selected from silver, gold, copper, nickel, platinum, palladium, tantalum, molybdenum, titanium, and the Like; or those of silver halide. In addition, the organic resin included in the conductive paste can be one or more organic resins selected from organic resins which serve as a binder, a solvent, a dispersing agent, or a coating material for the metal particles. An organic resin such as an epoxy resin or a silicone resin can be given as representative examples. Further, when the conductive film is formed, it is preferable to conduct baking after the conductive paste is applied. For example, in the case of using fine particles containing silver as a main constituent (e.g. the grain size is in the range of 1 to 100 nm inclusive) as a material for the conductive paste, the conductive film can be obtained by curing by being baked at a temperature in the range of 150 to 300° C. inclusive. Alternatively, fine particles containing solder or lead-free solder as a main constituent may be used. In that case, fine particles having a grain size of 20 μm or less are preferably used. Solder and lead-free solder have advantages of low cost and the like.

Next, as shown in FIG. 14C, an insulating film 1918 is formed so as to cover the conductive films 1917*a* and 1917*b*, and then a layer (hereinafter referred to as an element formation layer 1919) including the thin film transistors 1900*a* to 1900*f*, the conductive films 1917*a* and 1917*b*, and the like is separated from the substrate 1901. Here, after performing laser beam (e.g. UV light) irradiation to form openings in regions where the thin film transistors 1900*a* to 1900*f* are not formed, the element formation layer 1919 can be separated from the substrate 1901 using physical force. Alternatively, before the element formation layer 1919 is separated from the substrate 1901, an etchant may be introduced into the formed openings to selectively remove the separation layer 1903. As the etchant, a gas or liquid containing halogen fluoride or a halogen compound is used. For example, chlorine trifluoride ($ClF_3$) is used as a gas containing halogen fluoride. Accordingly, the element formation layer 1919 is separated from the substrate 1901. Note that the separation layer 1903 may be partially left instead of being removed entirely. By leaving a part of the separation layer 1903, consumption of the etchant and treatment time required for removing the separation layer can be reduced. Further, the element formation layer 1919 can be left over the substrate 1901 after the separation layer 1903 is removed. Furthermore, by reusing the substrate 1901 after the element formation layer 1919 is separated from the substrate 1901, cost can be reduced.

The insulating film 1918 can be formed by a CVD method, a sputtering method, or the like as a single-layer or stacked-layer structure of an insulating film which contains oxygen and/or nitrogen, such as silicon oxide, silicon nitride, silicon oxynitride, or silicon nitride oxide; a film containing carbon, such as DLC (diamond-like carbon); a film of an organic material such as epoxy, polyimide, polyamide, polyvinyl phenol, benzocyclobutene, or acrylic; or a film of a siloxane material such as a siloxane resin.

Figures 15A, 15B:
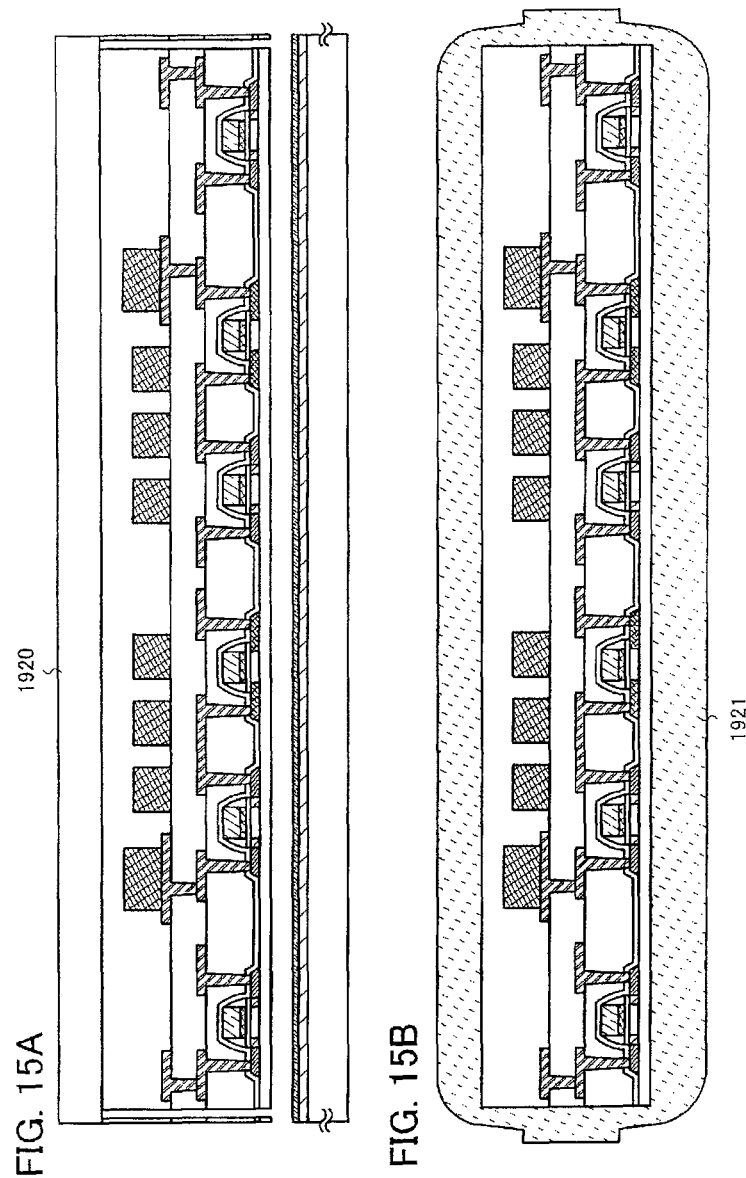
FIGS. 15A and 15B are cross-sectional views showing a method for manufacturing a semiconductor device including a clock signal generation circuit of Embodiment Mode 4 of the present invention.
Figure 19A:
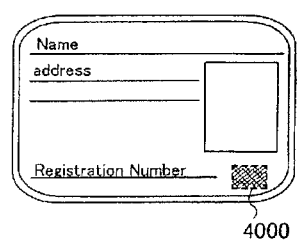
FIGS. 19A to 19F are diagrams showing usage examples of a semiconductor device including a clock signal generation circuit of Embodiment Mode 6 of the present invention.
Figure 19B:
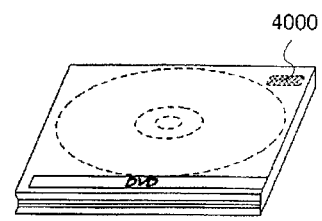
Figure 19C:
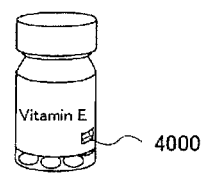
Figure 19D:
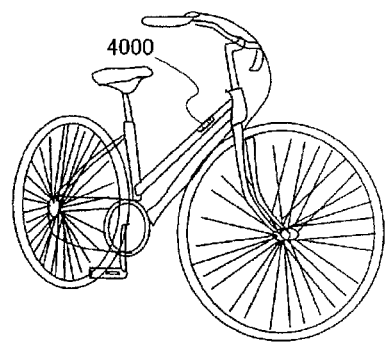
Figure 19E:
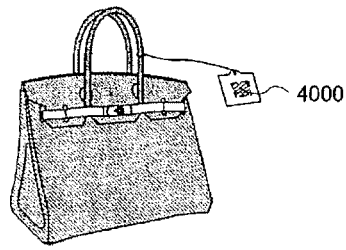
Figure 19F:
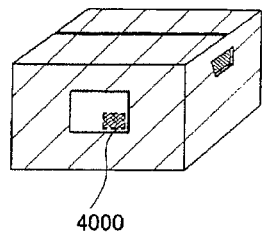

In this embodiment mode, as shown in FIG. 15A, the openings are formed in the element formation layer 1919 by laser beam irradiation, and then a first sheet material 1920 is attached to one surface of the element formation layer 1919 (a surface where the insulating film 1918 is exposed). Then, the element formation layer 1919 is separated from the substrate 1901.

Next, as shown in FIG. 15B, after attaching a second sheet material 1921 to the other surface of the element formation layer 1919 (a surface which is exposed by separation), one or both of heat treatment and pressure treatment is performed, so that the second sheet material 1921 is attached firmly. As the first sheet material 1920 and the second sheet material 1921, a hot-melt film or the like can be used.

As the first sheet material 1920 and the second sheet material 1921, a film on which antistatic treatment for preventing static electricity or the like has been performed (hereinafter referred to as an antistatic film) can be used. Examples of antistatic films include a film in which a material capable of preventing electrostatic charge is dispersed in a resin, and a film to which a material capable of preventing electrostatic charge is attached. A film provided with a material capable of preventing electrostatic charge may be a film for which a material capable of preventing electrostatic charge is provided over one of its surfaces, or a film for which a material capable of preventing electrostatic charge is provided over both of its surfaces. Concerning the film for which a material capable of preventing electrostatic charge is provided over one of its surfaces, the film may be attached to the layer such that the material capable of preventing electrostatic charge is on the inner side of the film or the outer side of the film. Note that the material capable of preventing electrostatic charge may be provided over an entire surface of the film, or over a part of the film. As the material capable of preventing electrostatic charge, a metal, indium tin oxide (ITO), or a surfactant such as an amphoteric surfactant, a cationic surfactant, or a nonionic surfactant can be used. In addition, as an antistatic material, a resin material containing a cross-linked copolymer having a carboxyl group and a quaternary ammonium base on its side chain, or the like can be used. By attaching, mixing, or applying such a material to a film, an antistatic film can be formed. By performing sealing with the antistatic film, adverse influence on a semiconductor element by static electricity from outside and the like can be suppressed when the semiconductor element is dealt with as a product.

Although this embodiment mode illustrates the case where the element formation layer 1919 is used after being separated from the substrate 1901, the element formation layer 1919 may be formed over the substrate 1901 without forming the separation layer 1903, and may be used for a semiconductor device. If an SOI (silicon on insulator) substrate is used for the substrate 1901, a single-crystalline semiconductor film may be used as the semiconductor film, and in that case, time that would be required for crystallization of the semiconductor film can be saved.

As described above, with a manufacturing method of this embodiment mode, a semiconductor device provided with a clock signal generation circuit according to this invention, which is small-sized, has flexibility to a physical shape, and can generate a stable clock signal, can be provided.

This embodiment mode can be combined with other embodiment modes as appropriate.

Embodiment Mode 5

This embodiment mode describes an example in which a semiconductor device provided with a clock signal generation circuit of the present invention is manufactured using a transistor formed on a single-crystalline substrate.

First, as illustrated in FIG. 16A, element-isolation insulating films 2301 for electrically isolating semiconductor elements are formed in a semiconductor substrate 2300. The element-isolation insulating films 2301 can electrically isolate regions in which transistors are to be formed (element formation regions 2302 and 2303).

The semiconductor substrate 2300 can be, for example, a single-crystalline silicon substrate having n-type or p-type conductivity, a compound semiconductor substrate (a GaAs substrate, InP substrate, GaN substrate, SiC substrate, sapphire substrate, ZnSe substrate, or the like), an SOI (silicon on insulator) substrate formed by a bonding method or a SIMOX (separation by implanted oxygen) method, or the like. In the case of using an SOI substrate, the semiconductor substrate 2300 may have a structure in which the SOI substrate is attached to a glass substrate.

The element-isolation insulating films 2301 can be formed by a selective oxidation method (LOCOS method: local oxidation of silicon method), a trench isolation method, or the like.

This embodiment mode illustrates an example in which a single-crystalline silicon substrate having n-type conductivity is used for the semiconductor substrate 2300 and a p-well 2304 is formed in the element formation region 2303. The p-well 2304 formed in the element formation region 2303 of the semiconductor substrate 2300 can be formed by selectively introducing a p-type impurity element into the element formation region 2303. Examples of the p-type impurity element include boron, aluminum, and gallium. In the case of using a semiconductor substrate having p-type conductivity for the semiconductor substrate 2300, an n-well may be formed in the element formation region 2302 by selectively introducing an n-type impurity element into the element formation region 2302.

In this embodiment mode, an impurity element is not introduced into the element formation region 2302 because an n-type semiconductor substrate is used for the semiconductor substrate 2300; however, an n-well may be formed in the element formation region 2302 by introducing an n-type impurity element into the element formation region 2302. Examples of the n-type impurity element include phosphorus and arsenic.

Next, insulating films 2305 and 2306 are formed to cover the element formation regions 2302 and 2303, respectively, as shown in FIG. 16B. In this embodiment mode, the semiconductor substrate 2300 is thermally oxidized, so that silicon oxide films formed in the element formation regions 2302 and 2303 are used as the insulating films 2305 and 2306, respectively. Further, after the formation of the silicon oxide films by thermal oxidation, nitridation treatment may be performed to nitride the surfaces of the silicon oxide films and form silicon oxynitride films, so that a stacked-layer structure of a silicon oxide film and a silicon oxynitride film can be used for each of the insulating films 2305 and 2306.

Further, the insulating films 2305 and 2306 may be formed also by plasma treatment. For example, by oxidizing or nitriding the surface of the semiconductor substrate 2300 by high-density plasma treatment, silicon oxide films or silicon nitride films can be formed as the insulating films 2305 and 2306 in the element formation regions 2302 and 2303.

Next, as shown in FIG. 16C, a conductive film is formed to cover the insulating films 2305 and 2306. This embodiment mode shows an example in which a conductive film 2307 and a conductive film 2308 are stacked in this order as the conductive film. However, the conductive film may have a single-layer structure or a stacked-layer structure of three or more layers.

The conductive films 2307 and 2308 can be formed using tantalum, tungsten, titanium, molybdenum, aluminum, copper, chromium, niobium, or the like. Alternatively, the conductive films 2307 and 2308 may be formed using an alloy film which contains the above metal as a main constituent or a film formed using a compound which contains the above metal. Further alternatively, a semiconductor such as poly-crystalline silicon, which is obtained by doping a semiconductor film with an impurity element that imparts conductivity such as phosphorus or the like, may be used. In this embodiment mode, the conductive film 2307 is formed using tantalum nitride, and the conductive film 2308 is formed using tungsten.

Next, as shown in FIG. 17A, the stacked conductive films 2307 and 2308 are patterned into a given shape, so that gate electrodes 2309 and 2310 are formed over the insulating films 2305 and 2306, respectively.

Next, as shown in FIG. 17B, a resist mask 2311 is selectively formed to cover the element formation region 2302. Then, an impurity element is introduced into the element formation region 2303, with the gate electrode 2310 as well as the resist mask 2311 serving as a mask. Accordingly, impurity regions 2312 that function as a source or drain region and a channel formation region 2313 are formed in the p-well 2304. An n-type impurity element or a p-type impurity element is used as the impurity element. Examples of the n-type impurity element include phosphorus and arsenic. Examples of the p-type impurity element include boron, aluminum, and gallium. In this embodiment mode, phosphorus is used as the impurity element.

Next, the resist mask 2311 is removed and a resist mask 2314 is selectively formed to cover the element formation region 2303 as shown in FIG. 17C. Then, an impurity element is introduced into the element formation region 2302, with the gate electrode 2309 as well as the resist mask 2314 serving as a mask. Accordingly, impurity regions 2315 that function as a source or drain region and a channel formation region 2316 are formed in the element formation region 2302 of the semiconductor substrate 2300. An n-type impurity element or a p-type impurity element is used as the impurity element. Examples of the n-type impurity element include phosphorus and arsenic. Examples of the p-type impurity element include boron, aluminum, and gallium. In this embodiment mode, an impurity element (e.g. boron) having an opposite conductivity type to the impurity element that has been introduced into the element formation region 2303 in FIG. 17B is used.

Next, as shown in FIG. 18A, an insulating film 2317 is formed to cover the insulating films 2305 and 2306 and the gate electrodes 2309 and 2310. Then, contact holes are formed in the insulating film 2317 to partly expose the impurity regions 2312 and 2315. Next, conducive films 2318 are formed to be connected to the impurity regions 2312 and 2315 through the contact holes. The conductive films 2318 can be formed by a CVD method, a sputtering method, or the like.

The insulating film 2317 can be formed using an inorganic material, an organic material, or a mixed material of an organic material and an inorganic material. For example, silicon oxide, silicon oxynitride, silicon nitride oxide, a film containing carbon as typified by DLC (diamond-like carbon), acrylic, epoxy, polyimide, polyamide, polyvinyl phenol, or benzocyclobutene can be used. The insulating film 2317 can be formed by a CVD method, a sputtering method, a droplet discharge method, a printing method, or the like depending on a material used.

Note that the structures of the transistors used for the semiconductor device of the present invention are not limited to those illustrated in this embodiment mode. For example, an inversely staggered structure may be used.

Next, an interlayer film 2324 is formed as shown in FIG. 18B. Then, the interlayer film 2324 is etched to form a contact hole that partly exposes the conductive film 2318. The material of the interlayer film 2324 is not limited to resins, and another film such as a CVD oxide film can be used. However, resins are preferably used in terms of flatness. Further, the contact hole may be formed using a photosensitive resin instead of using etching. Next a wiring 2325 in contact with the conductive film 2318 through the contact hole is formed over the interlayer film 2324.

Next, a conductive film 2326 that functions as an antenna is formed to be in contact with the wiring 2325. The conductive film 2326 can be formed using a metal such as silver, gold, copper, palladium, chromium, platinum, molybdenum, titanium, tantalum, tungsten, aluminum, iron, cobalt, zinc, tin, or nickel. Alternatively, the conductive film 2326 may be formed using an alloy film which contains the above metal as a main constituent or a film formed using a compound which contains the above metal. The conductive film 2326 may be either a single layer or stacked layers of the aforementioned film(s).

The conductive film 2326 can be formed by a CVD method, a sputtering method, a printing method such as screen printing or gravure printing, a droplet discharge method, a dispensing method, a plating method, a photolithography method, a vapor deposition method, or the like.

Although this embodiment mode has illustrated the example in which the antenna is formed over the same substrate as that of the semiconductor elements, the present invention is not limited to this structure. For example, after the formation of semiconductor elements, an antenna which is formed separately may be electrically connected to an integrated circuit having the semiconductor elements. In this case, electrical connection between the antenna and the integrated circuit can be achieved by pressure bonding with the use of an anisotropic conductive film (ACF), an anisotropic conductive paste (ACP), or the like. Further, connection can also be achieved using a conductive adhesive such as a silver paste, a copper paste, or a carbon paste; soldering, or the like.

As described above, with the use of a manufacturing method of this embodiment mode, variation in characteristics of transistors can be suppressed; therefore, the number of transistors used in a semiconductor device can be reduced, and a semiconductor device provided with a clock signal generation circuit of the present invention, which can generate a stable clock signal, can be provided.

This embodiment mode can be combined with other embodiment modes as appropriate.

Embodiment Mode 6

This embodiment mode describes usage examples of a semiconductor device provided with a clock signal generation circuit in the above embodiment modes.

FIGS. 19A to 19F show usage examples of a semiconductor device provided with a clock signal generation circuit in the above embodiment modes. A semiconductor device can be employed for a wide range of uses and can be used by being provided for objects such as bills, coins, securities, bearer bonds, certificates (driver's licenses, resident cards, and the like; see FIG. 19A), containers for wrapping objects (wrapping paper, bottles, and the like; see FIG. 19C), recording media (DVD software, video tapes, and the like; see FIG. 19B), vehicles (bicycles and the like; see FIG. 19D), personal belongings (bags, glasses, and the like), foods, plants, animals, human bodies, clothes, daily necessities, or products such as electronic devices (liquid crystal display devices, EL display devices, television units, mobile phones, and the like); tags of each product (see FIGS. 19E and 19F); or the like.

A semiconductor device 4000 of the present invention is fixed to an object by being mounted on a printed board, being attached to a surface, or being incorporated into the object. For example, the semiconductor device 4000 is incorporated in paper of a book or an organic resin package to be fixed to each object. As for the semiconductor device 4000 of the present invention, a small size, a low profile, and light weight are achieved; thus, the design of an object is not impaired even after being fixed to the object. Further, by providing the semiconductor device 4000 of the present invention for bills, coins, securities, bearer bonds, certificates, and the like, an identification function can be obtained and forgery thereof can be prevented by utilizing the identification function. Furthermore, by providing the semiconductor device 4000 of the present invention for containers for wrapping, recording media personal belongings, foods, clothes, daily necessities, electronic devices, and the like, a system such as an inspection system can be carried out efficiently. Still furthermore, by providing the semiconductor device 4000 of the present invention for vehicles, security against theft can be enhanced.

As described above, by utilizing a semiconductor device provided with a clock signal generation circuit of the present invention for each use in this embodiment mode, a stable operation can be achieved; therefore, authentication, security, and the like of an object can be enhanced.

This embodiment mode can be combined with other embodiment modes as appropriate.

This application is based on Japanese Patent Application serial No. 2007-117849 filed with Japan Patent office on Apr. 27, 2007, the entire contents of which are hereby incorporated by reference.

What is claimed is:

1. A clock signal generation circuit comprising:
a reference clock signal generation circuit;
an edge detection circuit configured to detect an edge of an input signal; and
a duty ratio selection circuit,
wherein the reference clock signal generation circuit is configured to generate a reference clock signal and to output the reference clock signal to the duty ratio selection circuit, and
wherein the clock signal generation circuit is configured to generate a clock signal by selecting a duty ratio, from data of a plurality of duty ratios stored in the duty ratio selection circuit, in accordance with a signal from the edge detection circuit.

2. The clock signal generation circuit according to claim 1 further comprising a frequency division circuit,
wherein the frequency division circuit is configured to divide the reference clock signal and generate the clock signal having the duty ratio selected by the duty ratio selection circuit.

3. The clock signal generation circuit according to claim 1, wherein the duty ratio selection circuit comprises a memory portion and a duty ratio selection portion.

4. The clock signal generation circuit according to claim 1, wherein the edge detection circuit is any combination of a latch circuit, a NOT circuit, an AND circuit, an OR circuit, a NAND circuit, a NOR circuit, an EXOR circuit, and an EX-NOR circuit.

5. A semiconductor device comprising the clock signal generation circuit according to claim 1.

6. A clock signal generation circuit comprising:
a reference clock signal generation circuit configured to generate a reference clock signal; and
a duty ratio selection circuit,
wherein the clock signal generation circuit is configured to generate a clock signal by comparing a difference in frequency between an input signal to the duty ratio selection circuit and the reference clock signal and by selecting a duty ratio from data of a plurality of duty ratios stored in the duty ratio selection circuit.

7. The clock signal generation circuit according to claim 6 further comprising an edge detection circuit, and a counter circuit, wherein the edge detection circuit is configured to detect an edge of an input signal to the edge detection circuit,
wherein the counter circuit is configured to count the number of edges of the reference clock signal in accordance with a signal output from the edge detection circuit, and
wherein a signal from the counter circuit is the input signal to the duty ratio selection circuit.

8. The clock signal generation circuit according to claim 6, wherein the duty ratio selection circuit comprises a memory portion and a duty ratio selection portion.

9. The clock signal generation circuit according to claim 7, wherein the edge detection circuit is any combination of a latch circuit, a NOT circuit, an AND circuit, an OR circuit, a NAND circuit, a NOR circuit, an EXOR circuit, and an EX-NOR circuit.

10. A semiconductor device comprising the clock signal generation circuit according to claim 6.

11. A clock signal generation circuit comprising:
a counter circuit configured to count the number of edges of a reference clock signal in accordance with an input signal to the clock signal generation circuit;
a duty ratio selection circuit configured to select a duty ratio, from data of a plurality of stored duty ratios, in accordance with a signal from the counter circuit and the reference clock signal,
wherein the clock signal generation circuit is configured to generate a clock signal with the duty ratio selected at the duty ratio selection circuit.

12. The clock signal generation circuit according to claim 11 further comprising a reference clock signal generation circuit,
wherein the reference clock signal generation circuit is configured to generate the reference clock signal and to output the reference clock signal to the duty ratio selection circuit and the counter circuit.

13. The clock signal generation circuit according to claim 11, wherein the duty ratio selection circuit comprises a memory portion and a duty ratio selection portion.

14. A semiconductor device comprising the clock signal generation circuit according to claim 11.

15. The clock signal generation circuit according to claim 11 further comprising a frequency division circuit,
wherein the frequency division circuit is configured to divide the reference clock signal and generate the clock signal having the duty ratio selected by the duty ratio selection circuit.

* * * * *

UNITED STATES PATENT AND TRADEMARK OFFICE
CERTIFICATE OF CORRECTION

PATENT NO. : 8,416,000 B2  
APPLICATION NO. : 12/609422  
DATED : April 9, 2013  
INVENTOR(S) : Masami Endo It is certified that error appears in the above-identified patent and that said Letters Patent is hereby corrected as shown below:

In the Specification

Column 6, line 1, replace "al" with --an--;

Column 10, line 8, replace "member" with --number--;

Column 13, line 12, after "60" replace "µm" with --nm--;

Column 13, line 53, after "Er," replace "Tin" with --Tm--;

Column 15, line 27, replace "impunity" with --impurity--;

Column 15, line 30, replace "$1\times10^{15}/Cm^3$" with --$1\times10^{15}/cm^3$--;

Column 16, line 20, after "transistors" replace "1900e" with --1900c--;

Column 17, line 67, replace "Like" with --like--.

Signed and Sealed this  
Twenty-eighth Day of January, 2014

Michelle K. Lee  
*Deputy Director of the United States Patent and Trademark Office*